US006259990B1

(12) United States Patent
Shojima et al.

(10) Patent No.: US 6,259,990 B1
(45) Date of Patent: Jul. 10, 2001

(54) INFORMATION PROCESSING APPARATUS AND PEDESTRIAN NAVIGATION SYSTEM USING THE SAME

(75) Inventors: Hiroshi Shojima, Hitachiohta; Tomo Yashiki, Tokyo, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/463,782

(22) PCT Filed: May 15, 1998

(86) PCT No.: PCT/JP98/02151

§ 371 Date: Jan. 28, 2000

§ 102(e) Date: Jan. 28, 2000

(87) PCT Pub. No.: WO99/60338

PCT Pub. Date: Nov. 25, 1999

(51) Int. Cl.[7] .......... G06G 7/78

(52) U.S. Cl. .......... 701/209; 701/211; 340/944; 340/825.19; 367/910

(58) Field of Search .......... 701/209, 201, 701/208, 214, 211; 342/24; 367/910, 99, 124; 434/112; 340/944, 825.19

(56) References Cited

U.S. PATENT DOCUMENTS 5,470,233 * 11/1995 Fruchterman et al. .......... 434/112
5,508,699 * 4/1996 Silverman .......... 340/944
5,842,145 * 11/1998 Zimmer .......... 701/201

* cited by examiner

*Primary Examiner*—William A. Cuchlinski, Jr.
*Assistant Examiner*—Yonel Beaulieu
(74) *Attorney, Agent, or Firm*—Antonelli, Terry, Stout & Kraus, LLP

(57) ABSTRACT

A route computation apparatus having pedestrian-oriented map information for pedestrian route guidance, a portable route guidance apparatus, and markers located in an installation. A medium translation function is also included for translating input information of a given medium to information of another medium for output depending on current status of a pedestrian, whereby the information of interest is translated into information in a format suitable for the state in which the pedestrian is utilizing the portable apparatus.

3 Claims, 27 Drawing Sheets

STATIONARY ROUTE COMPUTATION AND INFORMATION PROVIDING APPARATUS EQUIPPED WITH COMMUNICATION FUNCTION (1)

DESTINATION, CONDITIONS

ROUTE INFORMATION, RELATED MAP INFORMATION

PORTABLE ROUTE GUIDANDE APPARATUS EQUIPPED WITH COMMUNICATION AND POSITION /DIRECTION FINDING FUNCTIONS (2)

INSTALLATION INFORMATION (LOCATIONS AND TYPES OF EQUIPMENT INSIDE)

STATIONARY INSTALLATION MARKER EQUIPPED WITH COMMUNICATION FUNCTION (e. g., ENTRANCE TO BUILDING) (3)

STATIONARY INSTALLATION MARKER EQUIPPED WITH COMMUNICATION FUNCTION (e. g., IN FRONT OF ELEVATOR) (3)

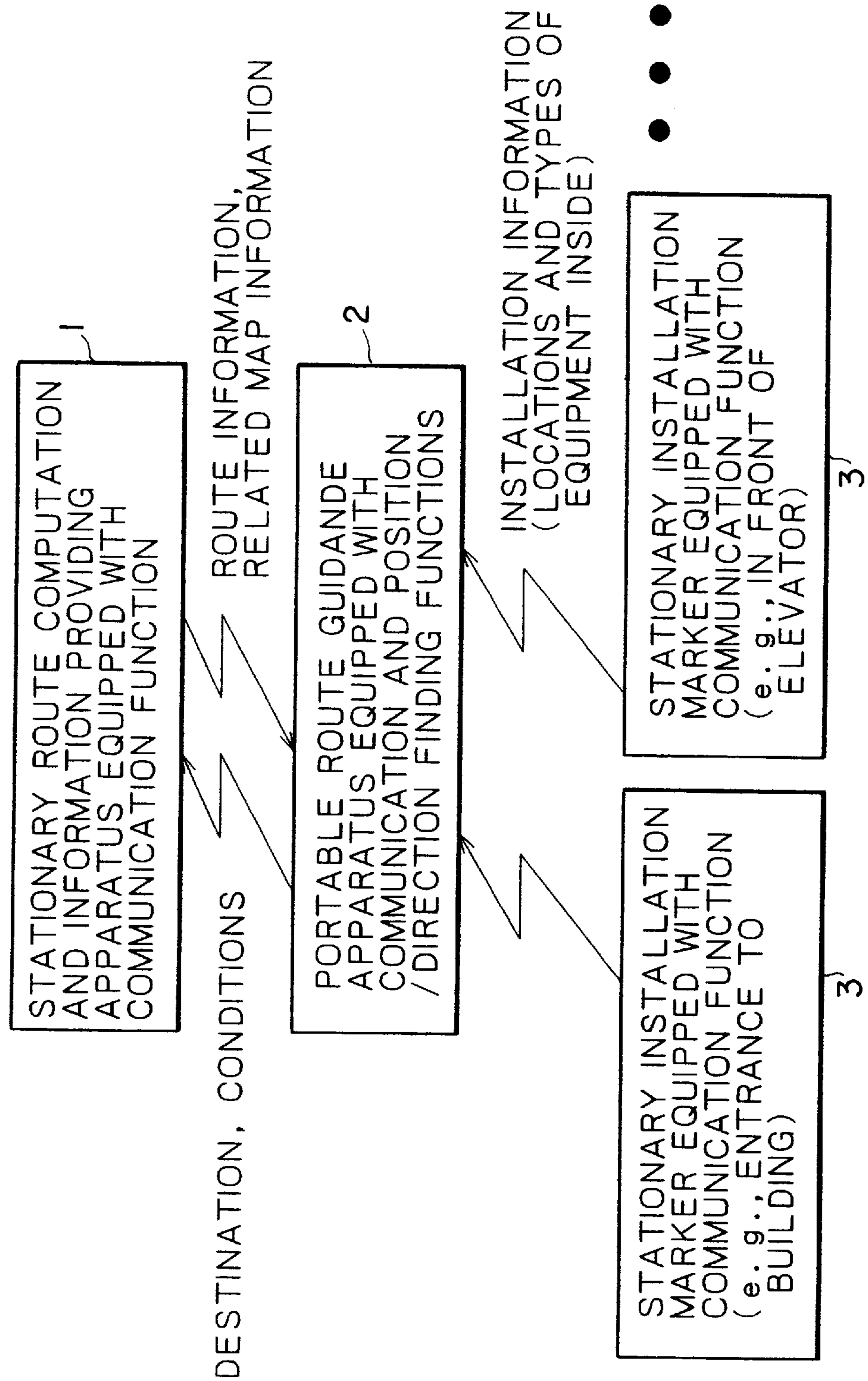
FIG. 1
1
STATIONARY ROUTE COMPUTATION AND INFORMATION PROVIDING APPARATUS EQUIPPED WITH COMMUNICATION FUNCTION
ROUTE INFORMATION, RELATED MAP INFORMATION
DESTINATION, CONDITIONS
2
PORTABLE ROUTE GUIDANDE APPARATUS EQUIPPED WITH COMMUNICATION AND POSITION /DIRECTION FINDING FUNCTIONS
INSTALLATION INFORMATION (LOCATIONS AND TYPES OF EQUIPMENT INSIDE)
3
STATIONARY INSTALLATION MARKER EQUIPPED WITH COMMUNICATION FUNCTION (e.g., IN FRONT OF ELEVATOR)
3
STATIONARY INSTALLATION MARKER EQUIPPED WITH COMMUNICATION FUNCTION (e.g., ENTRANCE TO BUILDING)

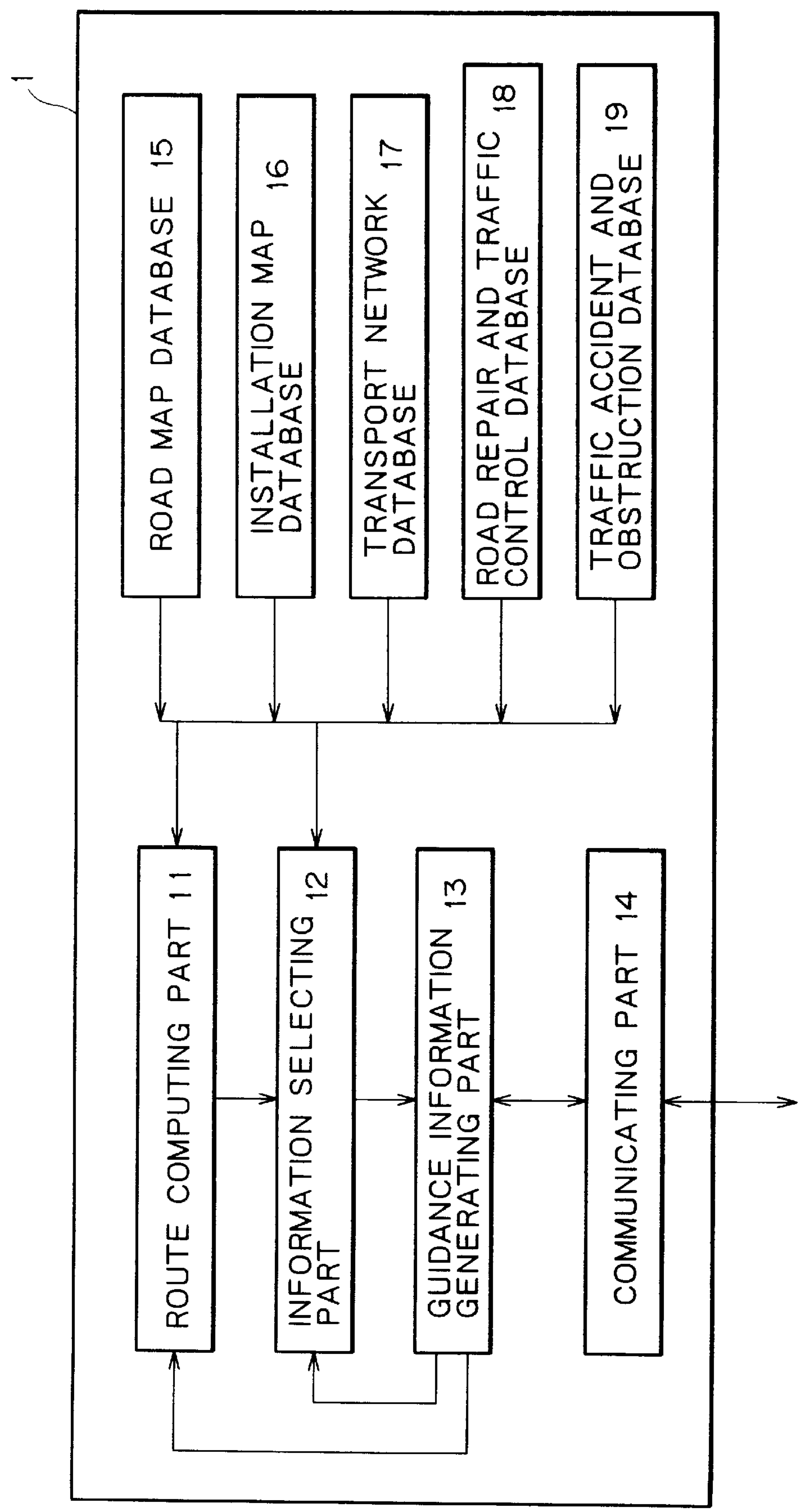
F I G. 2
1
ROAD MAP DATABASE 15
INSTALLATION MAP DATABASE 16
TRANSPORT NETWORK DATABASE 17
ROAD REPAIR AND TRAFFIC CONTROL DATABASE 18
TRAFFIC ACCIDENT AND OBSTRUCTION DATABASE 19
ROUTE COMPUTING PART 11
INFORMATION SELECTING PART 12
GUIDANCE INFORMATION GENERATING PART 13
COMMUNICATING PART 14

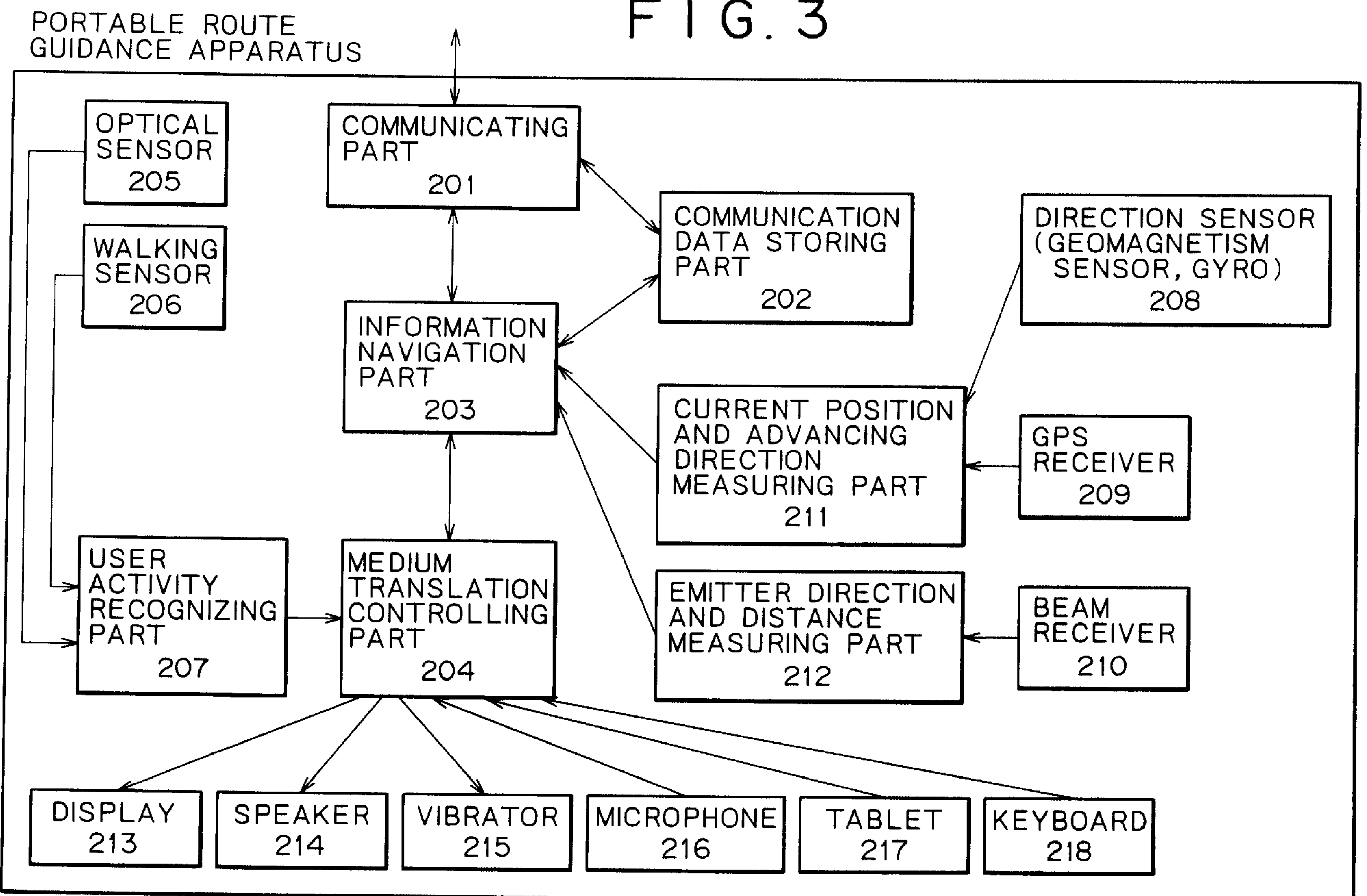
FIG. 3
PORTABLE ROUTE GUIDANCE APPARATUS
OPTICAL SENSOR 205
WALKING SENSOR 206
COMMUNICATING PART 201
INFORMATION NAVIGATION PART 203
COMMUNICATION DATA STORING PART 202
DIRECTION SENSOR (GEOMAGNETISM SENSOR, GYRO) 208
CURRENT POSITION AND ADVANCING DIRECTION MEASURING PART 211
GPS RECEIVER 209
USER ACTIVITY RECOGNIZING PART 207
MEDIUM TRANSLATION CONTROLLING PART 204
EMITTER DIRECTION AND DISTANCE MEASURING PART 212
BEAM RECEIVER 210
DISPLAY 213
SPEAKER 214
VIBRATOR 215
MICROPHONE 216
TABLET 217
KEYBOARD 218

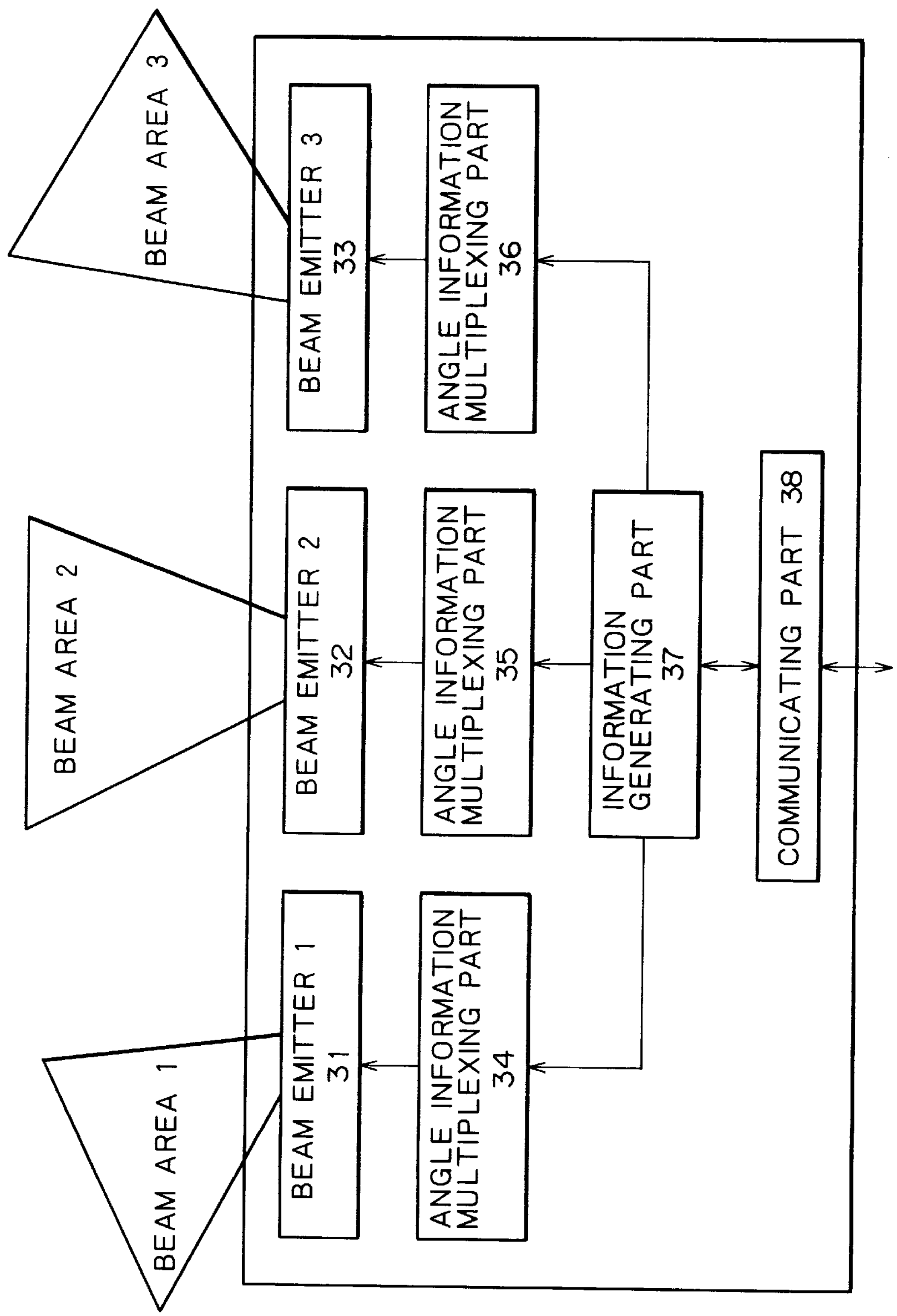
F I G. 4
BEAM AREA 1
BEAM AREA 2
BEAM AREA 3
BEAM EMITTER 1 31
BEAM EMITTER 2 32
BEAM EMITTER 3 33
ANGLE INFORMATION MULTIPLEXING PART 34
ANGLE INFORMATION MULTIPLEXING PART 35
ANGLE INFORMATION MULTIPLEXING PART 36
INFORMATION GENERATING PART 37
COMMUNICATING PART 38

F I G. 16A

| LOCATION NAMES (ID) | POSITIONS (POS) | BEAM DIRECTIONS (BD) | LINKS |
|---|---|---|---|
| BUILDING A | LAT. a1, LONG. a2 | 315 DEG., 0 DEG., 45 DEG. | C1 |
| .... | .... | .... | .... |
| OOO MUSEUM m | LAT. m1, LONG. m2 | 315 DEG., 0 DEG., 45 DEG. | mh, C4 |
| .... | .... | .... | .... |
| CROSSING C1 | LAT. c11, LONG. c12 | 0 DEG., 90 DEG., 180 DEG., 270 DEG. | C2, C3 |
| CROSSING C2 | LAT. c21, LONG. c22 | 0 DEG., 90 DEG., 180 DEG., 270 DEG. | C1, C4 |
| CROSSING C3 | LAT. c31, LONG. c32 | 0 DEG., 90 DEG., 180 DEG., 270 DEG. | C1, C4 |
| CROSSING C4 | LAT. c41, LONG. c42 | 0 DEG., 90 DEG., 180 DEG., 270 DEG. | C2, C3 |
| .... | .... | .... | .... |

FIG. 16B

| LOCATION NAMES (ID) | POSITIONS (POS) | BEAM DIRECTIONS (BD) | LINKS |
|---|---|---|---|
| OOO MUSEUM m | LAT.m1, LONG.m2 | 315 DEG., 0 DEG., 45 DEG. | mh, C4 |
| HALL mh, SAME MUSEUM | LAT.mh1, LONG.mh2 | 315 DEG., 0 DEG., 45 DEG. | m, me |
| ELEVATOR me, SAME MUSEUM | LAT.me1, LONG.me2 | 135 DEG., 180 DEG., 270 DEG. | connect mf1, mf2, mf3 |
| FIRST FLOOR mf1, SAME MUSEUM | DO. | 315 DEG., 0 DEG., 45 DEG. | me |
| .... | .... | .... | .... |
| THIRD FLOOR mf3, SAME MUSEUM | DO. | 315 DEG., 0 DEG., 45 DEG. | me |
| SECOND EXHIBITION ROOM mf3r2, SAME MUSEUM | LAT.mr1, LONG.mr2 | 315 DEG., 0 DEG., 45 DEG. | mf3 |
| .... | .... | .... | .... |

FIG. 17

| NAMES OF MEDIATING LOCATIONS (ID) | POSITIONS OF MEDIATING LOCATIONS (POS) | APPROACH DIRECTIONS (Din) | DEPARTURE DIRECTIONS (Dout) |
|---|---|---|---|
| BUILDING A | LAT. a1, LONG. a2 | 270 DEG. | 270 DEG. |
| CROSSING C1 | LAT. c11, LONG. c12 | 270 DEG. | 180 DEG. |
| CROSSING C3 | LAT. c31, LONG. c32 | 180 DEG. | 270 DEG. |
| CROSSING C4 | LAT. c41, LONG. c42 | 270 DEG. | 180 DEG. |
| OOO MUSEUM m | LAT. m1, LONG. m2 | 180 DEG. | 180 DEG. |
| HALL mh, SAME MUSEUM | LAT. mh1, LONG. mh2 | 180 DEG. | 300 DEG. |
| ELEVATOR me, SAME MUSEUM | LAT. me1, LONG. me2 | 300 DEG. | 0 DEG. |
| THIRD FLOOR mf3, SAME MUSEUM | DO. | 180 DEG. | 180 DEG. |
| SECOND EXHIBITION ROOM mf3r2, SAME MUSEUM | LAT. mr1, LONG. mr2 | 180 DEG. | 180 DEG. |

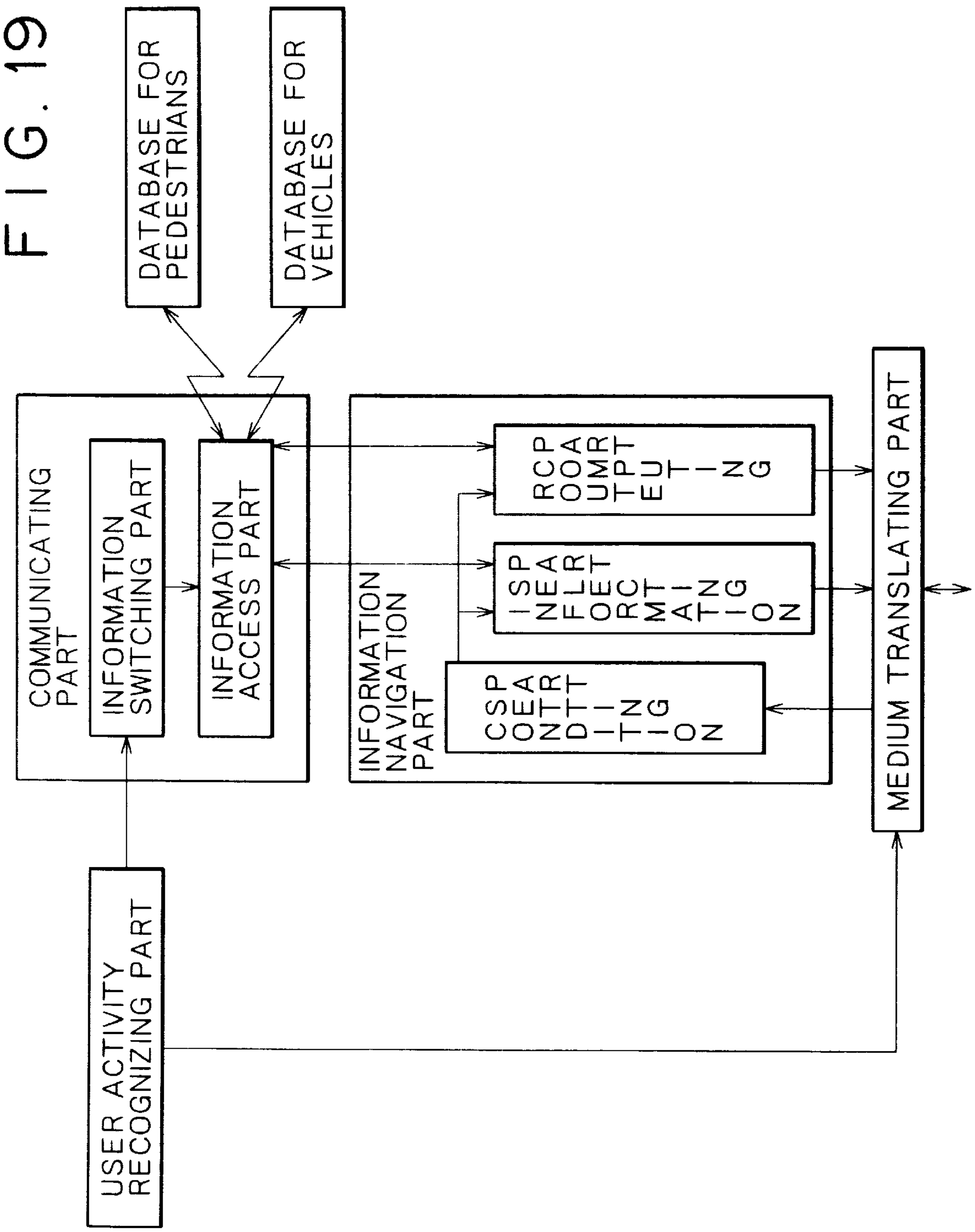
F I G. 19
DATABASE FOR PEDESTRIANS
DATABASE FOR VEHICLES
COMMUNICATING PART
INFORMATION SWITCHING PART
INFORMATION ACCESS PART
INFORMATION NAVIGATION PART
ROUTE COMPUTING PART
INFORMATION SELECTING PART
CONDITION SETTING PART
MEDIUM TRANSLATING PART
USER ACTIVITY RECOGNIZING PART

FIG. 24

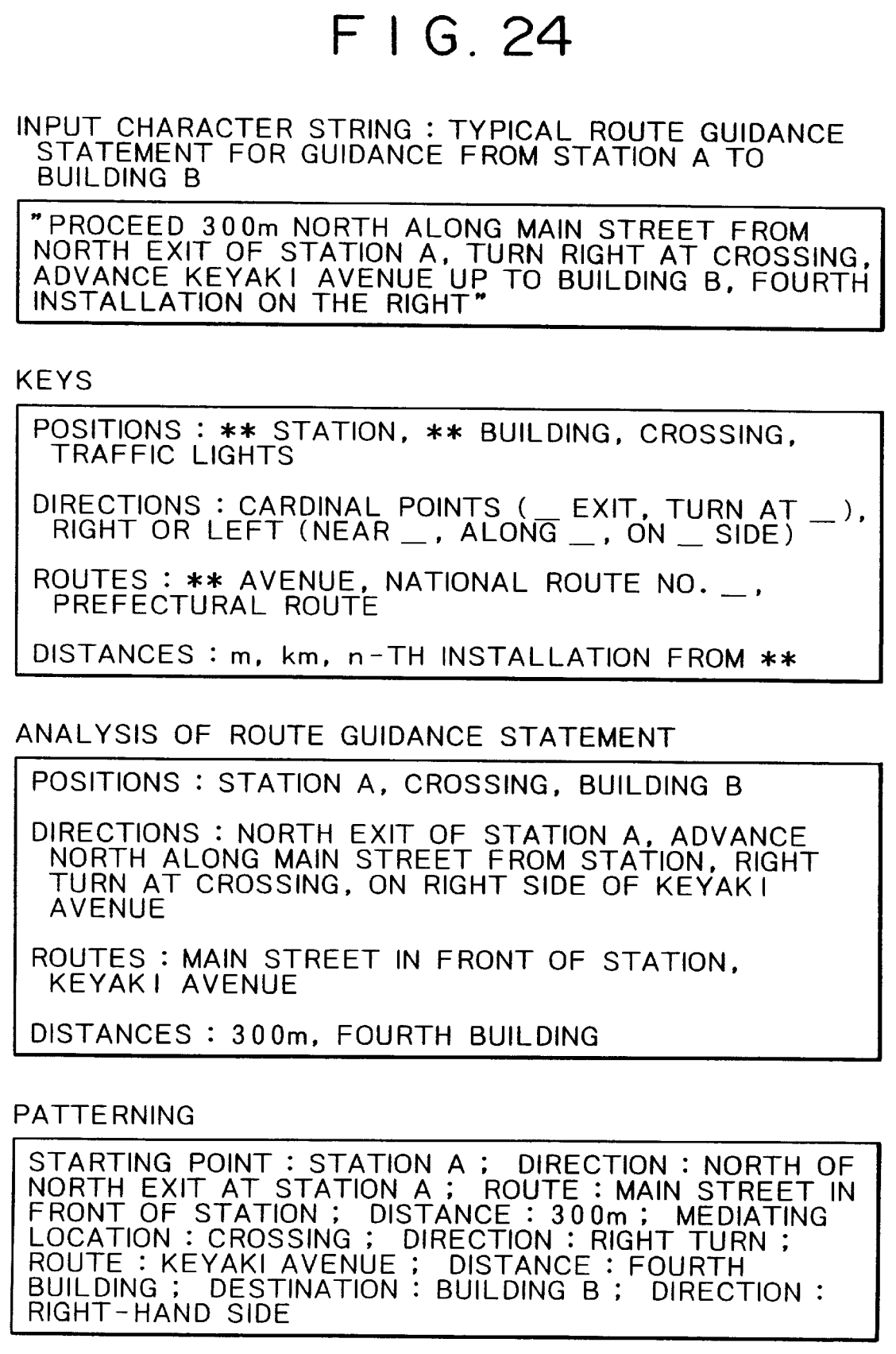

INPUT CHARACTER STRING : TYPICAL ROUTE GUIDANCE STATEMENT FOR GUIDANCE FROM STATION A TO BUILDING B

"PROCEED 300m NORTH ALONG MAIN STREET FROM NORTH EXIT OF STATION A, TURN RIGHT AT CROSSING, ADVANCE KEYAKI AVENUE UP TO BUILDING B, FOURTH INSTALLATION ON THE RIGHT"

KEYS

POSITIONS :  STATION,  BUILDING, CROSSING, TRAFFIC LIGHTS

DIRECTIONS : CARDINAL POINTS (__ EXIT, TURN AT __), RIGHT OR LEFT (NEAR __, ALONG __, ON __ SIDE)

ROUTES : ** AVENUE, NATIONAL ROUTE NO. __, PREFECTURAL ROUTE

DISTANCES : m, km, n-TH INSTALLATION FROM **

ANALYSIS OF ROUTE GUIDANCE STATEMENT

POSITIONS : STATION A, CROSSING, BUILDING B

DIRECTIONS : NORTH EXIT OF STATION A, ADVANCE NORTH ALONG MAIN STREET FROM STATION, RIGHT TURN AT CROSSING, ON RIGHT SIDE OF KEYAKI AVENUE

ROUTES : MAIN STREET IN FRONT OF STATION, KEYAKI AVENUE

DISTANCES : 300m, FOURTH BUILDING

PATTERNING

STARTING POINT : STATION A ; DIRECTION : NORTH OF NORTH EXIT AT STATION A ; ROUTE : MAIN STREET IN FRONT OF STATION ; DISTANCE : 300m ; MEDIATING LOCATION : CROSSING ; DIRECTION : RIGHT TURN ; ROUTE : KEYAKI AVENUE ; DISTANCE : FOURTH BUILDING ; DESTINATION : BUILDING B ; DIRECTION : RIGHT-HAND SIDE

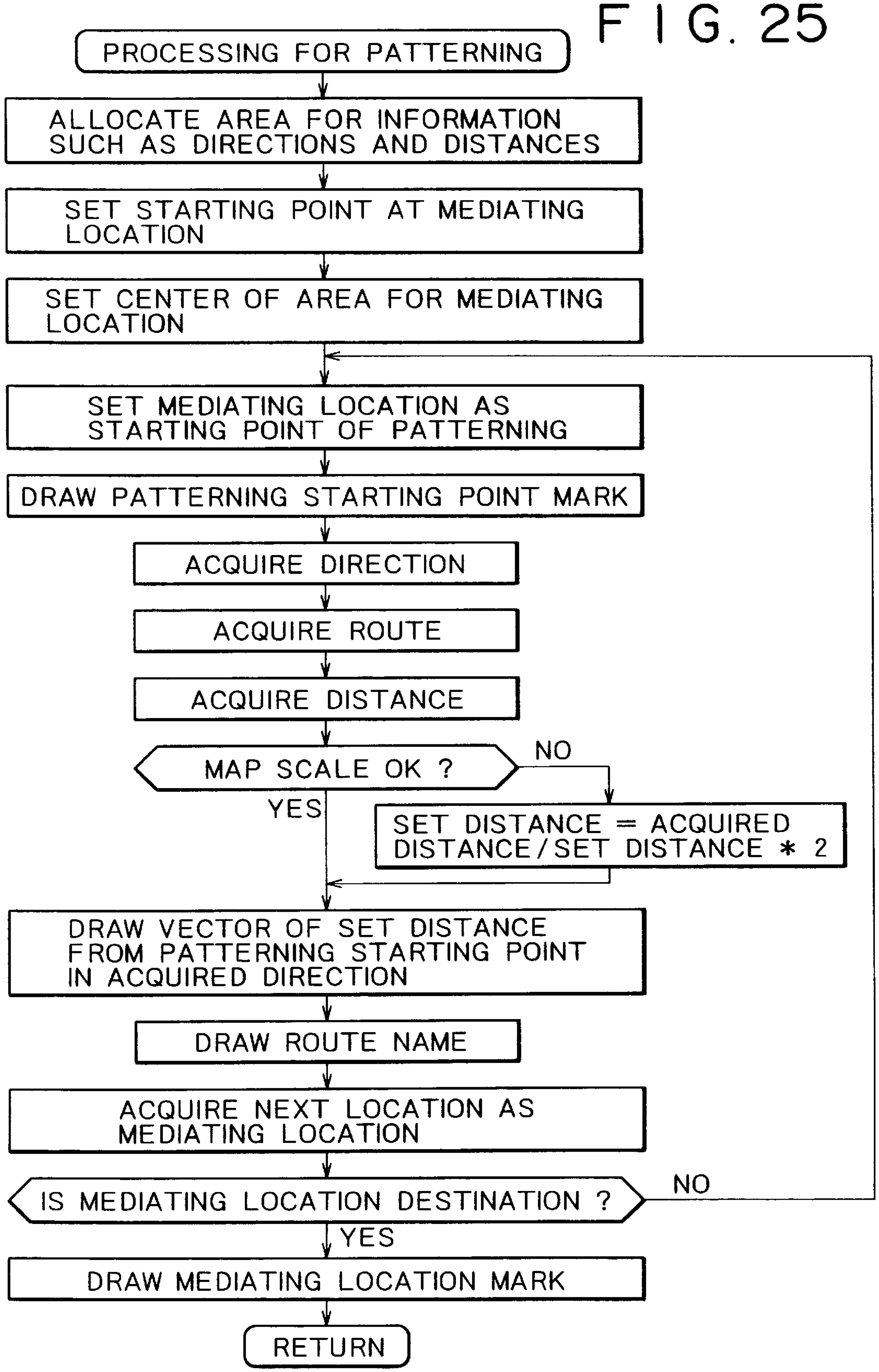
FIG. 25
PROCESSING FOR PATTERNING
ALLOCATE AREA FOR INFORMATION SUCH AS DIRECTIONS AND DISTANCES
SET STARTING POINT AT MEDIATING LOCATION
SET CENTER OF AREA FOR MEDIATING LOCATION
SET MEDIATING LOCATION AS STARTING POINT OF PATTERNING
DRAW PATTERNING STARTING POINT MARK
ACQUIRE DIRECTION
ACQUIRE ROUTE
ACQUIRE DISTANCE
MAP SCALE OK ?
NO
YES
SET DISTANCE = ACQUIRED DISTANCE/SET DISTANCE * 2
DRAW VECTOR OF SET DISTANCE FROM PATTERNING STARTING POINT IN ACQUIRED DIRECTION
DRAW ROUTE NAME
ACQUIRE NEXT LOCATION AS MEDIATING LOCATION
IS MEDIATING LOCATION DESTINATION ?
NO
YES
DRAW MEDIATING LOCATION MARK
RETURN

FIG. 31

| JUDGED STATE | SENSOR OUTPUT | | | TRANSLATION BETWEEN INFORMATION MEDIA | | | |
|---|---|---|---|---|---|---|---|
| | LIGHT INTENSITY | ACCELERATION | SOUND VOLUME | CHARACTERS | PATTERNS | IMAGES | VOICE |
| STATIONARY (STOPPING) | HIGH (BRIGHT) | CONSTANT IN DIRECTION OF GRAVITY | LOW | NO TRANSLATION | NO TRANSLATION | NO TRANSLATION | NO TRANSLATION |
| STATIONARY (STOPPING) | HIGH (BRIGHT) | CONSTANT IN DIRECTION OF GRAVITY | HIGH | NO TRANSLATION | NO TRANSLATION | NO TRANSLATION | TRANSLATED INTO CHARACTERS |
| STATIONARY (STOPPING) | LOW (DARK) | CONSTANT IN DIRECTION OF GRAVITY | LOW | TRANSLATED INTO VOICE | TRANSLATED INTO VOICE | TRANSLATED INTO VOICE | NO TRANSLATION |
| STATIONARY (STOPPING) | LOW (DARK) | CONSTANT IN DIRECTION OF GRAVITY | HIGH | TRANSLATED INTO VOICE | TRANSLATED INTO VOICE | TRANSLATED INTO VOICE | NO TRANSLATION |
| WALKING | HIGH (BRIGHT) | GRAVITY + ADVANCING DIRECTION | LOW | TRANSLATED INTO PATTERNS | NO TRANSLATION | NO TRANSLATION | NO TRANSLATION |
| WALKING | HIGH (BRIGHT) | GRAVITY + ADVANCING DIRECTION | HIGH | TRANSLATED INTO PATTERNS | NO TRANSLATION | NO TRANSLATION | TRANSLATED INTO CHARACTERS |
| WALKING | LOW (DARK) | GRAVITY + ADVANCING DIRECTION | LOW | TRANSLATED INTO VOICE | TRANSLATED INTO VOICE | TRANSLATED INTO VOICE | NO TRANSLATION |
| WALKING | LOW (DARK) | GRAVITY + ADVANCING DIRECTION | HIGH | SPECIFIED BY USER | SPECIFIED BY USER | SPECIFIED BY USER | SPECIFIED BY USER |
| • • | • • | • • | • • | • • | • • | • • | • • |
| | | | | | | | |

INFORMATION PROCESSING APPARATUS AND PEDESTRIAN NAVIGATION SYSTEM USING THE SAME

TECHNICAL FIELD

The present invention relates to techniques for supporting pedestrians on the move with information. More particularly, the invention relates to a pedestrian navigation system for navigating pedestrians by supplying them with information about their positions and position-related information.

BACKGROUND ART

Conventional systems for transmitting information to pedestrians include mobile telephones, portable computers, portable information communication systems linking a mobile telephone and a portable computer, and car navigation systems used in a detachable manner as route guidance systems for pedestrians or motorcycle riders. Information is made available in multimedia forms. These systems are ushering in an era where users can obtain desired multimedia information anytime, anywhere.

The basic assumption for such systems is that users on the move come to a stop when performing necessary manipulations to exchange information; information cannot be sent or received by users who are still on the move or at work. Transmitted information is received and reproduced with its attributes (images, text, patterns, voice, etc.) unmodified (i.e., image-attribute information is received as images, text information as text, pattern information as patterns, voice information as voice). The attribute-bound nature of reproduction has made it difficult for traveling or working users of the system to send or receive information adequately. The system also has had difficulty in effectively transmitting information to visually, auditorily or otherwise disabled users.

Route guidance systems based on transmitted information utilize the type of information employed by car navigation systems. For that reason, pedestrians using such systems have not received information detailed enough to navigate them through, say, the interior of a building.

DISCLOSURE OF INVENTION

According to the invention, transmitted information based on any given medium is translated into the medium format best suited for the system user's mode of activity at the moment. For example, information based on diverse media is translated into voice to let pedestrian users make better use of the translated information. Visually disabled users may be offered not only voice-attribute information but also information based on other media which is translated into a format suitable for the situation where the information is received. Such a medium translation function is implemented by use of a facility for dispatching on a real-time basis real-time medium recognition functions and real-time medium composition functions in accordance with the user's mode of activity at the transmitting or receiving side.

Detailed route guidance is implemented by installing at street corners and inside buildings information transmitters for transmitting electronically coded directional information as well as attribute information at least about the locations involved (name of a given building, its entrance, reception desk, elevators, etc.). The transmitted information is received by a telecommunication terminal held by each user. Based on field intensities and other parameters, the terminal computes the distance to a target location. By matching the computed information with route information stored inside, the terminal provides the user with route guidance not only outdoors but also inside a given building.

BRIEF DESCRIPTION OF DRAWINGS

FIG. 1 is a schematic view outlining a configuration of a system embodying the invention.

FIG. 2 is a block diagram showing a system configuration of a stationary route computation apparatus equipped with a communication function.

FIG. 3 is a block diagram depicting a system configuration of a portable route guidance apparatus equipped with communication and position direction finding functions.

FIG. 4 is a block diagram of an installation marker equipped with a communication function.

FIG. 16 are tabular views listing parameters of a road map and an installation map.

FIG. 17 is a tabular view listing parameters of a route map.

FIG. 19 is a block diagram of a modified portable route guidance apparatus for use both on a car and by a pedestrian.

FIG. 24 is a set of views showing a route guidance statement, keywords, analyzed results of a route statement, and patterning.

FIG. 25 is a flowchart of steps constituting a drawing process.

FIG. 31 is a table of correspondence between sensor outputs on the one hand and information media subject to translation on the other hand.

BEST MODE FOR CARRYING OUT THE INVENTION

Figure 5:
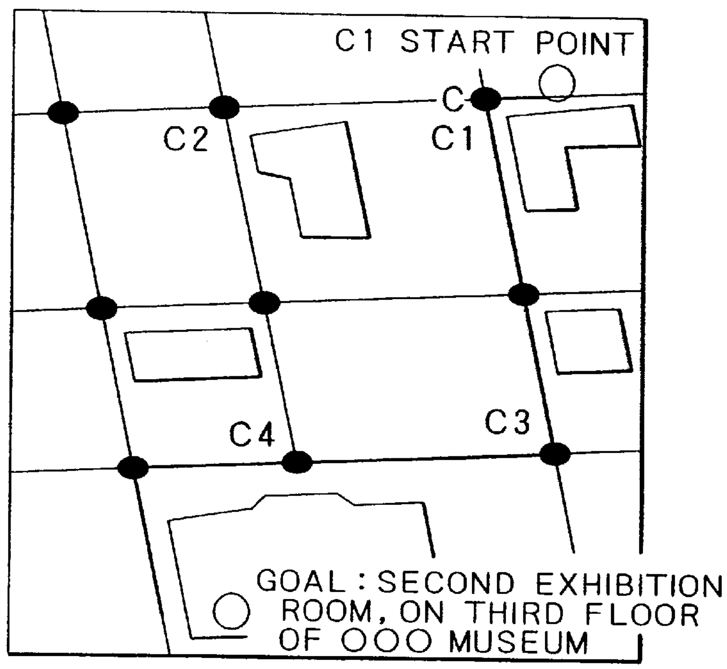
FIG. 5 is a schematic view showing how route guidance is provided conventionally.

FIG. 1 shows a configuration of a system embodying the invention. The system comprises a stationary route computation and information providing apparatus 1 equipped with a communication function (called the information providing apparatus 1 hereunder), a portable route guidance apparatus 2 equipped with communication and direction finding functions (called the route guidance apparatus hereunder), and a stationary installation marker 3 equipped with a communication function (called the marker hereunder). In operation, a user (pedestrian) carries the route guidance apparatus 2 around. When the pedestrian sends his or her current position and an intended destination through the route guidance apparatus 2 to the information providing apparatus 1, the apparatus 1 computes an appropriate route using necessary databases (maps, etc.) and sends the computed route information back to the route guidance apparatus 2. The pedestrian then moves toward the destination by following the transmitted route information presented by the route guidance apparatus 2. On his way to the destination, the pedestrian may receive on his route guidance apparatus 2 information from markers 3 mounted at an entrance to a building, at its elevator, and at other locations of the installation of interest. The marker-originated information helps provide the pedestrian with detailed route guidance.

FIG. 2 depicts a system configuration of the information providing apparatus 1 according to the invention. The information providing apparatus 1 comprises a route computing part 11 for acquiring a suitable route using pedestrian-oriented databases (e.g., a digital road map database 15 for pedestrians, an installation map database 16 containing information about structures and stores inside buildings, a transport network and timetable database 17 about public transportation, and a road repair and traffic control database 18 as well as a traffic accident and obstruction database 19 containing information about obstacles to pedestrian movements) and in response to requests from the user (current position, intended destination, etc.). The information providing apparatus 1 also includes: an information selecting part 12 for selecting necessary information in response to a request for installation guidance information; a guidance information generating part 13 for generating necessary guidance information by putting together information obtained by the route computing part 11 and information selecting part 12; and a communicating part 14 for communicating with the route guidance apparatus 2 carried by the user.

FIG. 3 sketches a system configuration of the route guidance apparatus 2 according to the invention. The route guidance apparatus 2 is driven by batteries and comprises: a communicating part 201 for communicating with the information providing apparatus 1 and markers 3; a communication data storing part 202 for recording communication data for storage; an information navigation part 203 for generating not only communication information to be sent to the information providing apparatus 1 but also guidance information destined for pedestrians based on the route information from the apparatus 1, on current position information from a current position and advancing direction measuring part 211 (direction information supplied from a direction sensor 208, current position fed from a GPS receiver 209), and on installation marker direction information from an emitter direction and distance measuring part 212 (connected to a beam receiver 210 receiving installation ID and beam emission direction information from the marker 3); a user activity recognizing part 207 for recognizing the user's walking activity (whether the route guidance apparatus 2 is held by hand or placed in a bag; whether the pedestrian is walking, running or at rest) by resorting to an optical sensor 205 mounted on a side of the route guidance apparatus 2 or to a walking sensor 206 constituted by acceleration sensors or the like; a medium translation controlling part 204 which translates user-originated information of a given medium into a medium format accessible by the information navigation part 203 in keeping with the output from the user activity recognizing part 207, and which translates guidance information from the information navigation part 203 into a medium format accessible by the user; and a group of I/O devices connected to the medium translation controlling part 204 (e.g., display 213, speaker 214, vibrator 215, microphone 216, tablet 217, keyboard 218).

Figure 11:
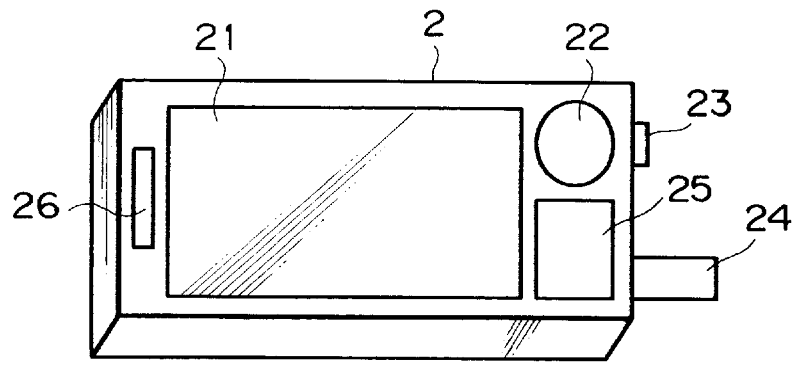
FIG. 11 is an external view of a communication function-equipped stationary route computation apparatus.

FIG. 11 is an external view of the route guidance apparatus 2. The apparatus 2 is made up of a flat display 213 overlaid with a touch-sensitive panel, a GPS antenna 209, a beam receiver 210, a communication antenna 201, a speaker 214 and a microphone 216. The GPS antenna 209 and communication antenna 201 can become unstable in operation upon interfering with each other depending on the frequencies of radio waves being used. The potential trouble is averted by mounting the two antennas well apart as illustrated, or by setting up a common antenna for receiving signals that may be suitably separated inside.

Figure 8:
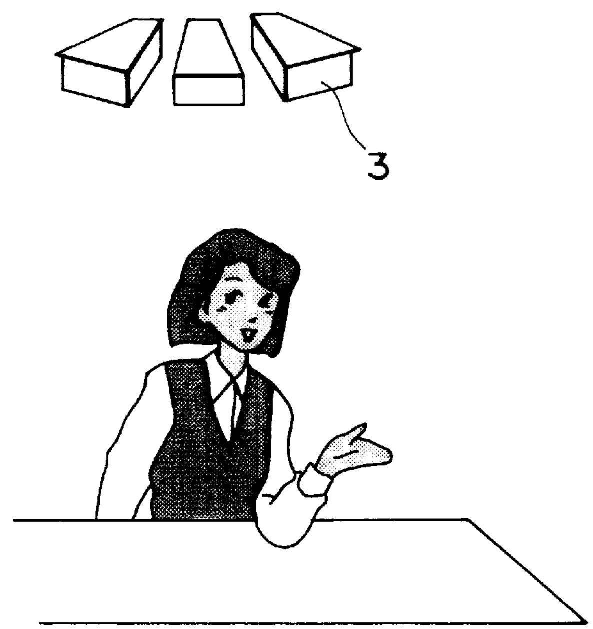
FIG. 8 is a schematic view showing how an installation marker is mounted.
Figure 9:
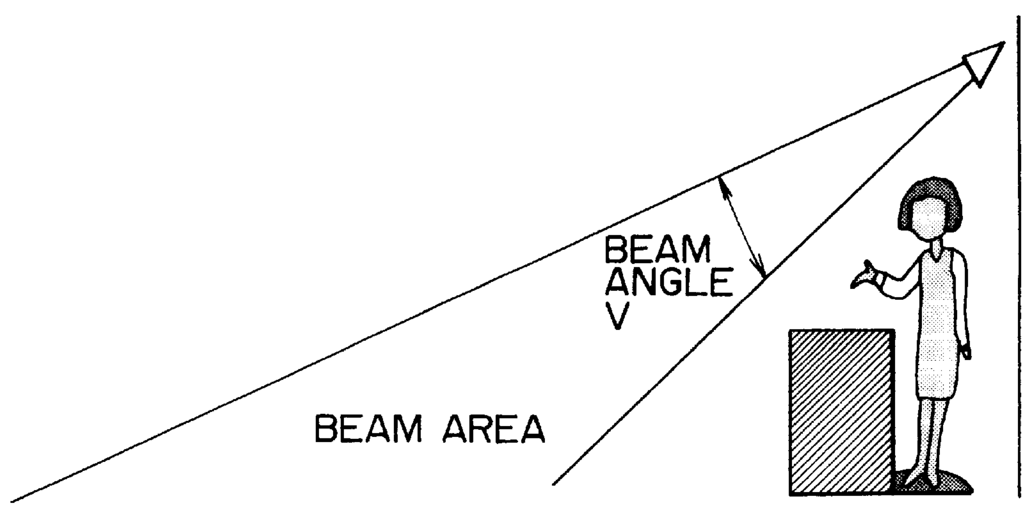
FIG. 9 is a side view depicting how an installation marker is typically mounted.
Figure 10:
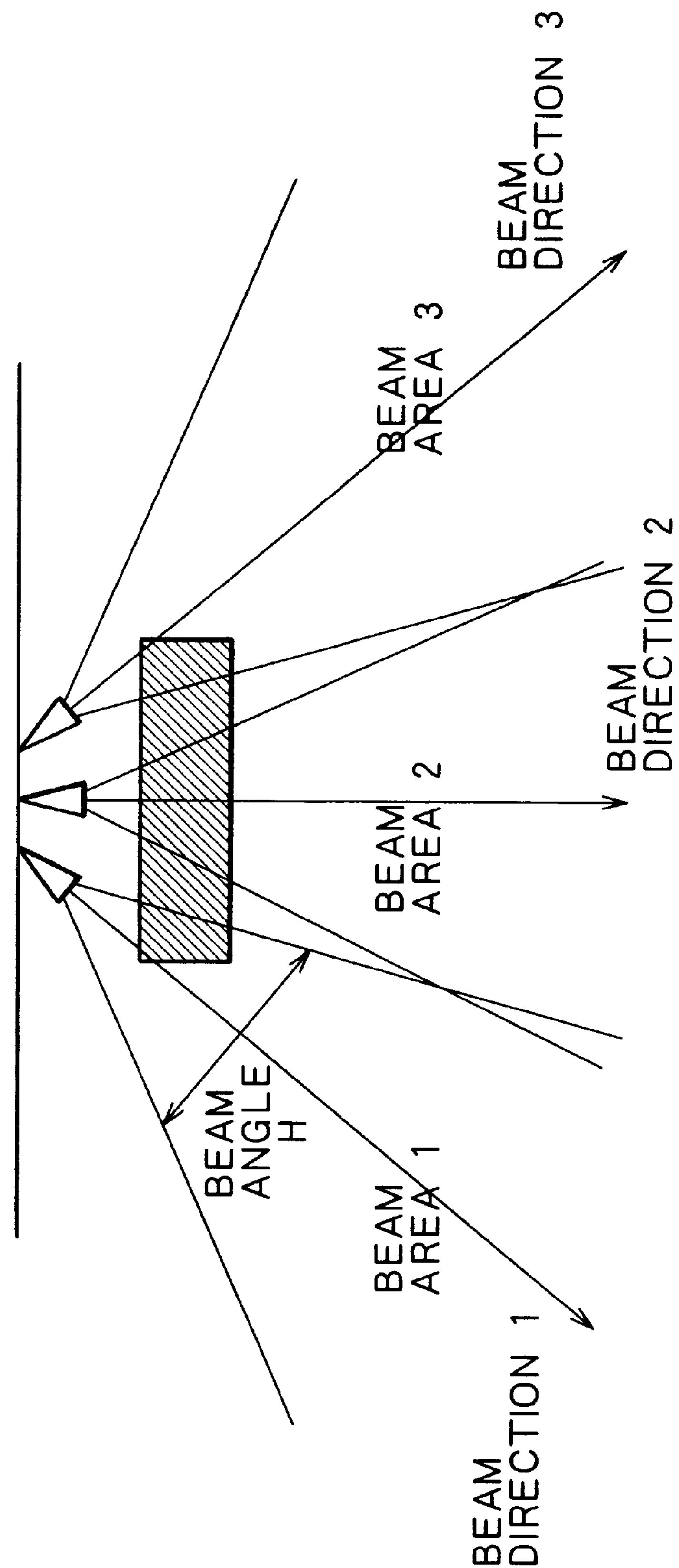
FIG. 10 is a plan view illustrating how an installation marker is mounted.

FIG. 4 depicts a system configuration of the marker 3 according to the invention. The marker 3 comprises: at least a set of angle information multiplexing parts 34, 35 and 36 which store installation information and which are connected to an information generating part 37 for outputting information; and beam emitters 31, 32 and 33 connected respectively to the angle information multiplexing parts 34, 35 and 36. A communicating part 38 may be provided for connection to an external information controlling apparatus whereby modification of installation information from the information generating part 37 is facilitated. If the beam emitters are designed to use optical beams, each beam emitter may illustratively utilize a lens system to restrict its range of beam emission. Beam angles may be determined illustratively on a 360-degree direction gauging arrangement, graduated clockwise with reference to the map direction of the north being set as zero. Where beams carry such angle information, the route guidance apparatus 2 receiving a given beam can readily determine the direction in which to guide the user. The markers 3 are furnished at an entrance to a building, at staircases inside, at an elevator, at the reception desk and other strategic points of the interior for route guidance. As shown in FIG. 8, a marker 3 is mounted illustratively above the reception desk as a beam emitter for emitting beams in three directions. FIG. 9 is a side view depicting how the marker is mounted, and FIG. 10 illustrates the mounting of the marker as viewed from above. Desired beam patterns are obtained by a suitable lens system if the beam emitter uses an optical beam or by an appropriate antenna arrangement if the beam emitter employs radio waves.

Figure 6:
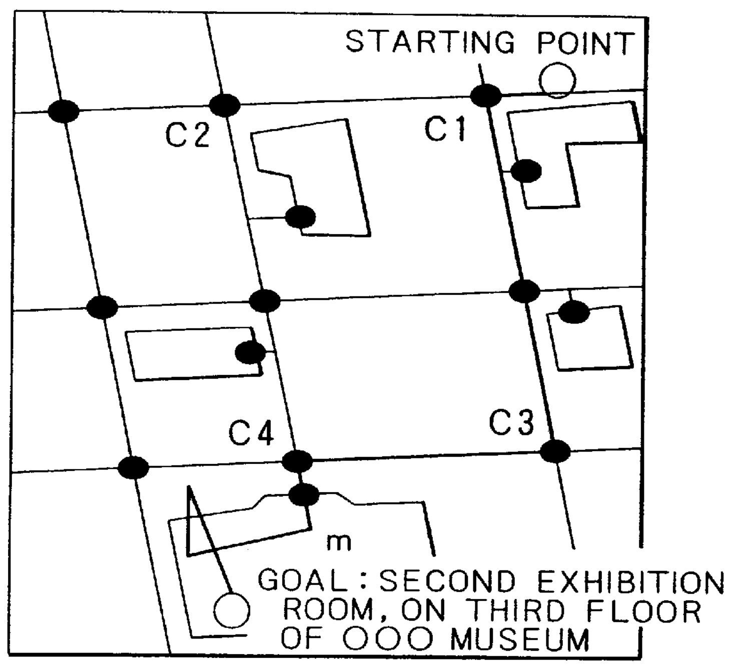
FIG. 6 is a schematic view illustrating how route guidance is provided according to the invention.
Figure 7:
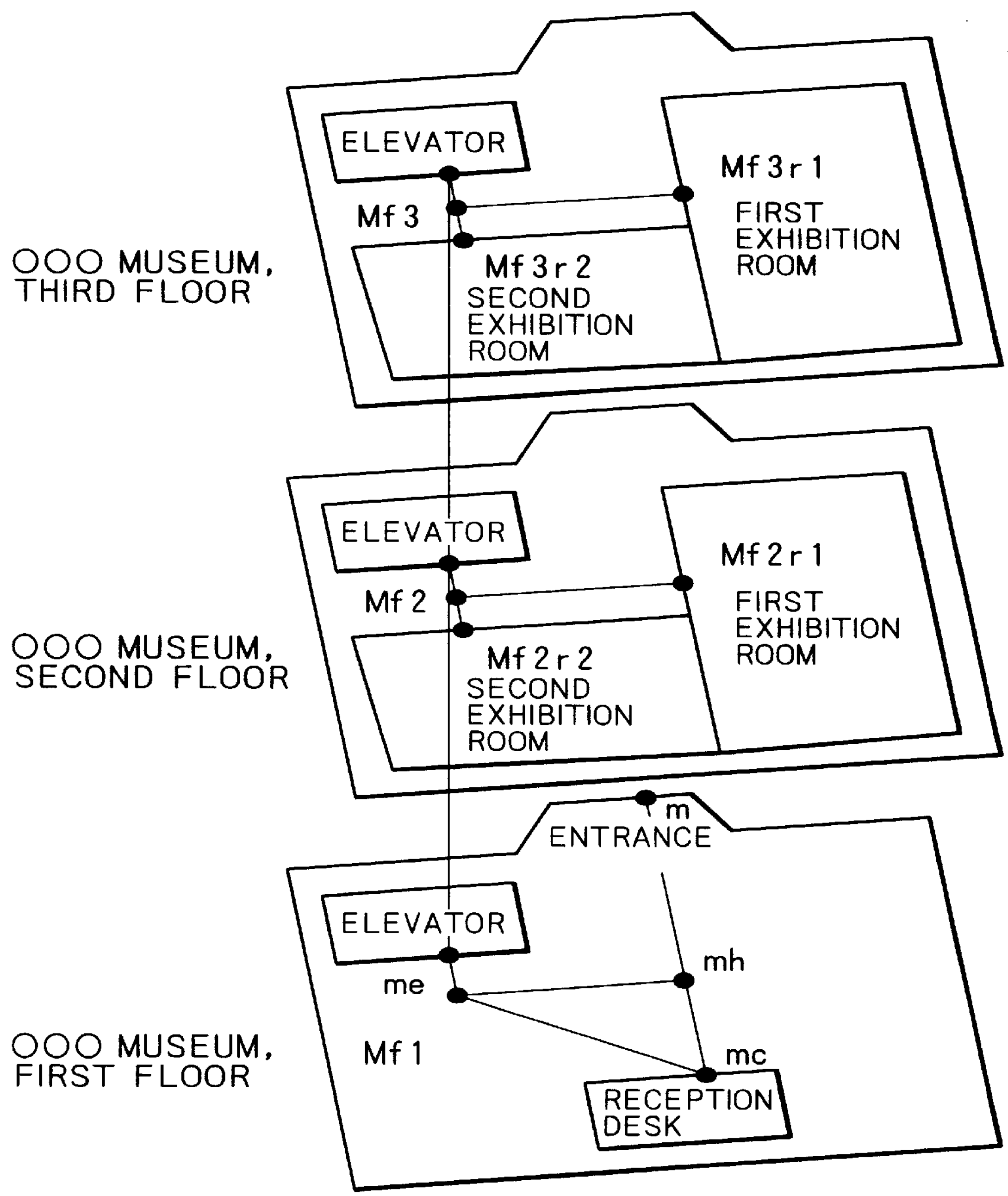
FIG. 7 is a map outlining the inside of an installation.

Described below with reference to FIGS. 5 through 7, FIGS. 16 through 18 is a procedure for computing the route from a starting point (FIGS. 5 and 6) to a goal (e.g., second exhibition room on the third floor of ○○○ Museum). Traditionally, route guidance has been targeted mainly for vehicles. Where a destination is established for such vehicular route guidance, the routing takes place along roads. An actual system may guide the user up to the road closest to the goal as shown in FIG. 5. A navigation system used by a pedestrian, on the other hand, is required to guide the user into the target building as depicted in FIG. 6. The requirement is met by provision of installation maps such as those shown in FIG. 7. Because outdoor-use positioning devices represented by GPS cannot be used inside buildings, guidance in the building interior requires setting up direction emitters such as markers 3 at strategic locations inside the installation. FIG. 16 lists typical database records of a road map and an installation map. In addition to traditional indications of crossings (C1, C2, C3, C4, etc.), FIG. 16(*a*) includes accessibility information for pedestrians and links to markers located at entrances to installations such as buildings. Besides the crossing locations, FIG. 16(*b*) includes positions of markers inside the installations, beam emission directions, and link information (IDs of adjacent markers).

Where route computations are carried out by use of the road and installation maps shown in FIG. 16, a procedure for routing along roads is separated from a procedure for routing inside installations. For the road routing, a road-bound goal is established at a mediating location "m" on the road. If the ultimate goal is located inside an installation, the ID of an adjacent road point is obtained from the link information in the installation map. In computation, the route along the roads (i.e., from the starting point through C1, C3, C4 and m) is first acquired, followed by the route inside the installation (passing through m, mh, mf1, me, mf3 and mf3*r*2).

Figure 18:
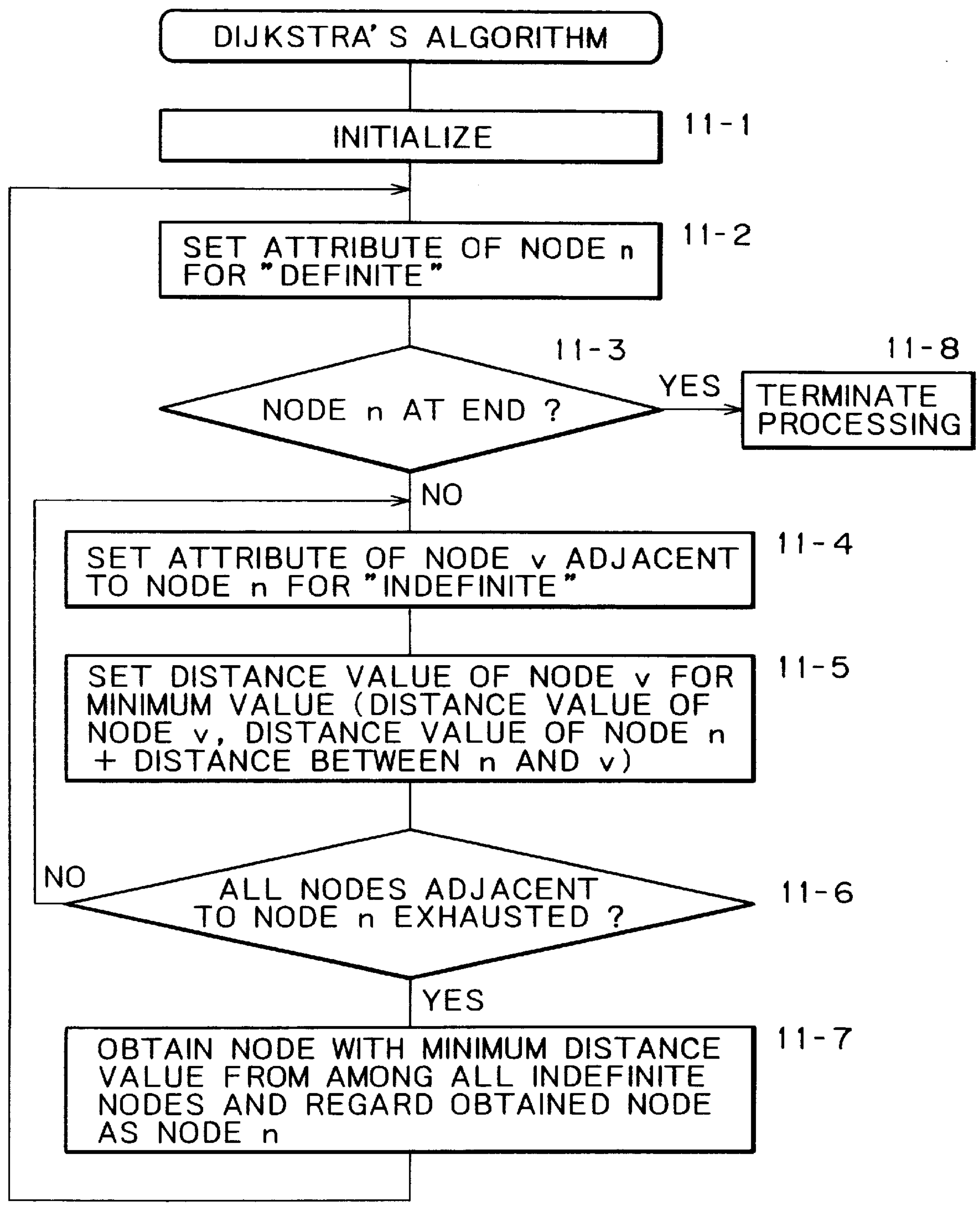
FIG. 18 is a flowchart of steps representing Dijkstra's method.

FIG. 18 is a flowchart of steps constituting Dijkstra's algorithm, a representative algorithm for route computation. Using the starting point as its initial value, the algorithm obtains minimum appraised values such as distances from one point to the next (nodes) until a goal is reached. Eventually a route represented by the minimum appraised values from the starting point to the goal is obtained. If a route inside a multiple-story installation needs to be acquired, as in the current example of the invention, there is no need to compute routing on all floors. That is, the computing time is reduced by searching through only the map of the floor where the goal is located.

FIG. 17 is table that lists results of route computations in this example. In terms of route information, the table includes ID names of mediating locations, positions of the mediating locations, approach angles to the mediating locations, and departure angles from the mediating locations. The two kinds of angle information are provided to help obtain the correct advancing direction, allowing for pedestrians' general tendency to change their bearings in an extremely erratic fashion, e.g., looking sideways and backwards while walking.

On the basis of the route information listed in FIG. 17, the route guidance apparatus 2 carried by the user guides him or her from the starting point to the goal. While operating outdoors, the apparatus 2 compares the route information with the current position and advancing direction derived from GPS. Once inside an installation (e.g., ○○○ Museum), the route guidance apparatus 2 cannot resort to GPS and relies instead on beams received from emitters for continuous guidance. The received beams reveal angle information which is translated into the direction, while the current position is acquired by measuring the intensity of the beams. Such a guidance method based on GPS and beam emissions may be applied illustratively to a system for guiding a vehicle from the streets into an underground parking lot. The method is also applicable to a system for physical distribution at port facilities, guiding containers from container yards to appropriate locations in the holds.

Figure 12:
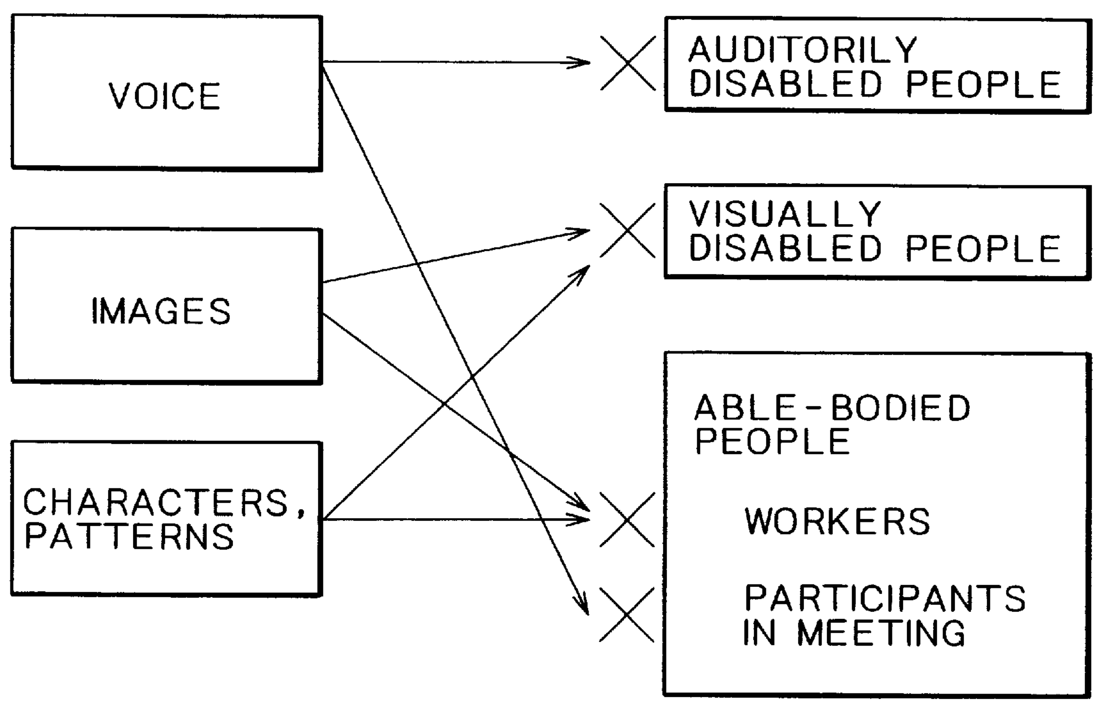
FIG. 12 is a schematic view showing situations in which information based on some media cannot be transmitted.

An information translation function will now be described with reference to FIGS. 12 through 15. Today's information services are offered typically in a multimedia format. That is, sets of information are expressed using multiple media such as characters, patterns, images and voice. Of these types of information being offered, visual information cannot be fully utilized by people at work (e.g., while walking) because, as shown in FIG. 12, their attempts to make use of such information could lead to an accident. In a crowded situation (e.g., a meeting), voice information can disturb people near the person receiving it. Such impediments to information availability also apply to visually disabled people being presented with visual information or to auditorily disabled people being offered voice information.

Figure 13:
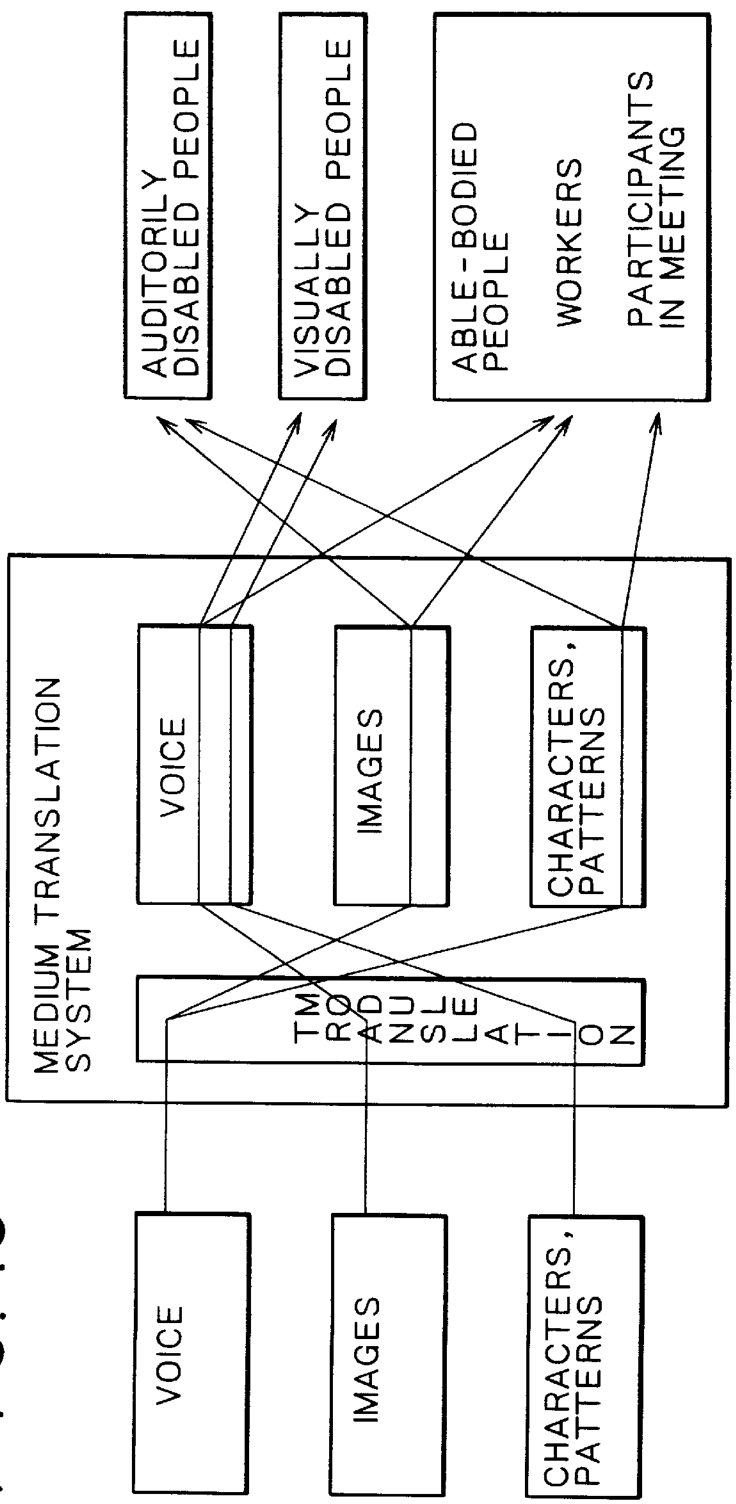
FIG. 13 is a schematic view sketching how information is translated between media.

In such cases, as illustrated in FIG. 13, the medium translation function translates the information of interest into information with an attribute accessible by the pedestrian (user) on the basis of the actual or judged state of activity of the pedestrian (user).

Figure 14:
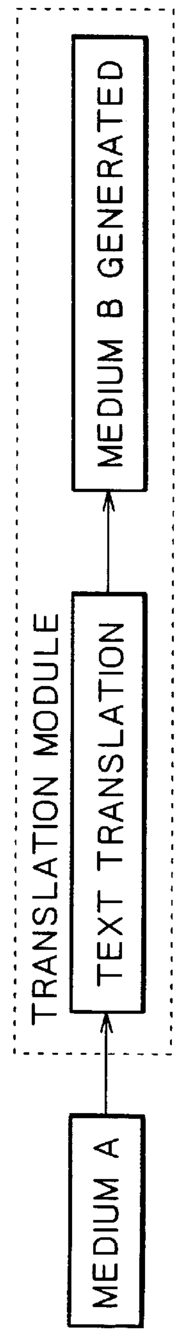
FIG. 14 is a schematic view indicating how information is translated from one medium to another.
Figure 15:
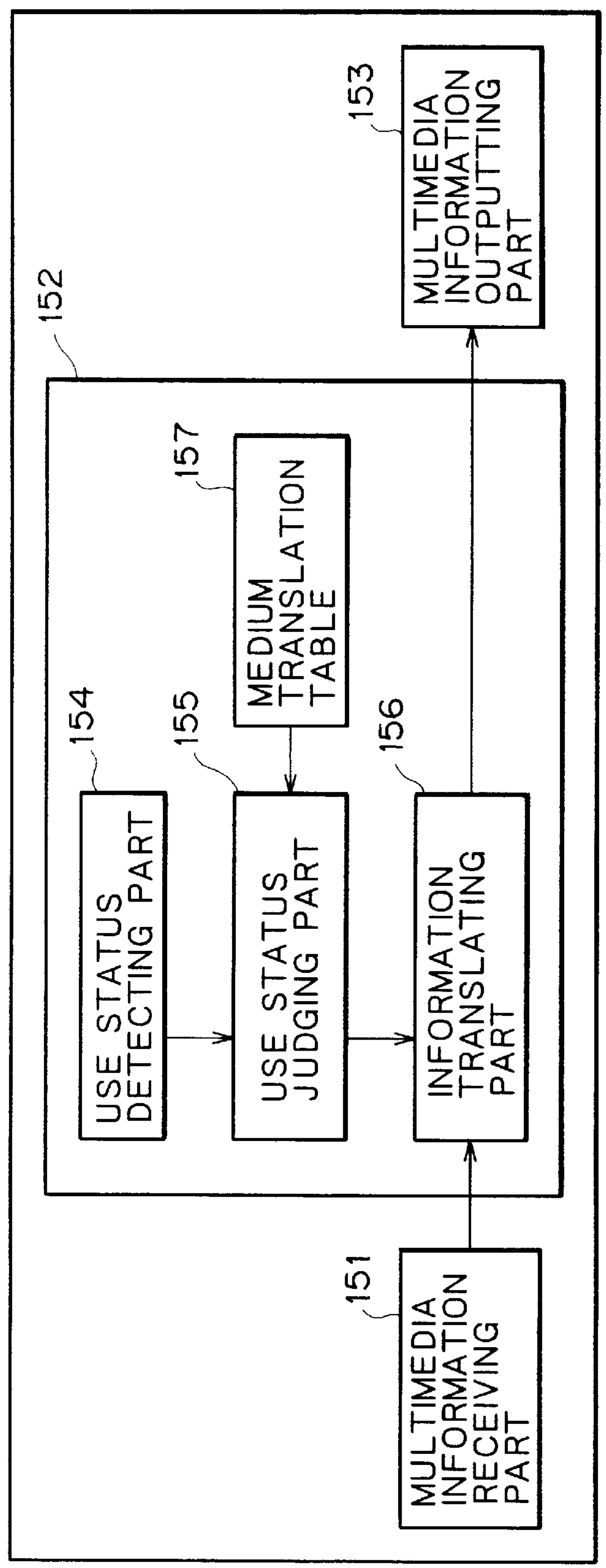
FIG. 15 is a block diagram of an information processing apparatus embodying the invention.

Basically, the medium translation function involves translating information of a given medium A into text by use of recognition techniques and reproducing information of a target medium using composition techniques, as shown in FIG. 14. Because the inventive apparatus determines into which medium to translate information of a given medium in accordance with the state of the pedestrian (user), the apparatus is illustratively constituted as shown in FIG. 15. Specifically, the constitution of FIG. 15 is acquired by supplementing the setup of FIG. 14 with a medium translation table that defines into which medium input information of a given medium is to be translated. The constitution primarily comprises: a multimedia information receiving part 151 for receiving multimedia information and the like; a medium translation module 152 (or information translating part) for translating the information received by the multimedia information receiving part 151; and a multimedia information outputting part 153 for outputting information translated by the medium translation module 152. The medium translation module is made up of a use status detecting part 154 for detecting the use status of the user utilizing the apparatus; a use status judging part 155 for judging the use status of the user on the basis of detected results from the use status detecting part 154 and in accordance with a medium translation table 157 defining beforehand which detected values from the use status detecting part 154 correspond to which user status; and an information translating part 156 for translating information received by the multimedia information receiving part 151 in a manner relevant to the judgment by the use status judging part 155. The use status detecting part 154 may be implemented illustratively in the form of an optical sensor, acceleration sensors, a sound volume sensor that measures the volume of sound picked up by microphones, or a temperature sensor. The medium translation table 157 may be established illustratively by sensors (205 and 206 in FIG. 3) which as a portion of the use status detecting part 154 obtain the user's status of activity, or by the pedestrian (user) issuing explicit settings (through menus, etc.). For example, if the optical sensor detects a low level of light (at a dark location), the apparatus is judged to be currently placed in a bag or the like. In that case, the information of interest is output by voice through earphones or the like. If the optical sensor detects a high level of light (at a well-lighted location) and if, say, acceleration sensors detect a stationary state through vibration analysis, the user is judged to be carrying the route guidance apparatus 2 by hand. In such a case, image information is provided unmodified. In this manner, the manner of offering information is changed automatically depending on the situation in which the information of interest is to be provided. If a microphone picks up an appreciably high level of ambient noise, then voice information indicating that location C3 is closed to traffic because of road repairs may be translated through voice recognition illustratively into characters for visual display. The information may be further analyzed and divided into "the location C3" on the one hand and "the closed traffic situation" on the other hand, which may be turned into "a closed traffic" indication on a road map through medium-to-medium translation. When information of a given medium is translated by the medium translation function into information of at least one other medium, desired information is offered to users with a minimum loss of informative ingredients regardless of the situation they find themselves in at a given moment. This allows the users to be more efficient than before in acquiring necessary information.

FIG. 19 is a partial block diagram of a modified portable route guidance apparatus for dual use both on a car and by a pedestrian. In the setup of FIG. 19, a user activity recognizing part judges whether the user is walking or driving a car, and sends the judgment to a communicating part. Depending on the user's state thus determined, the user activity recognizing part causes the communicating part to select either a database for pedestrians or a database for vehicles and to acquire suitable information therefrom. The setup allows the user to obtain route information in each of his or her two possible states of activity.

Described below with reference to FIGS. 20 through 30 is how a route map is generated illustratively from a route guidance statement.

The statement may be one in FIG. 24, specifying a route from "station A . . . to building B." It is assumed here that the route guidance statement "from station A to building B" is stored in advance as text information. The following processes are carried out to obtain eventually a route map such as one shown in FIG. 30.

Figure 20:
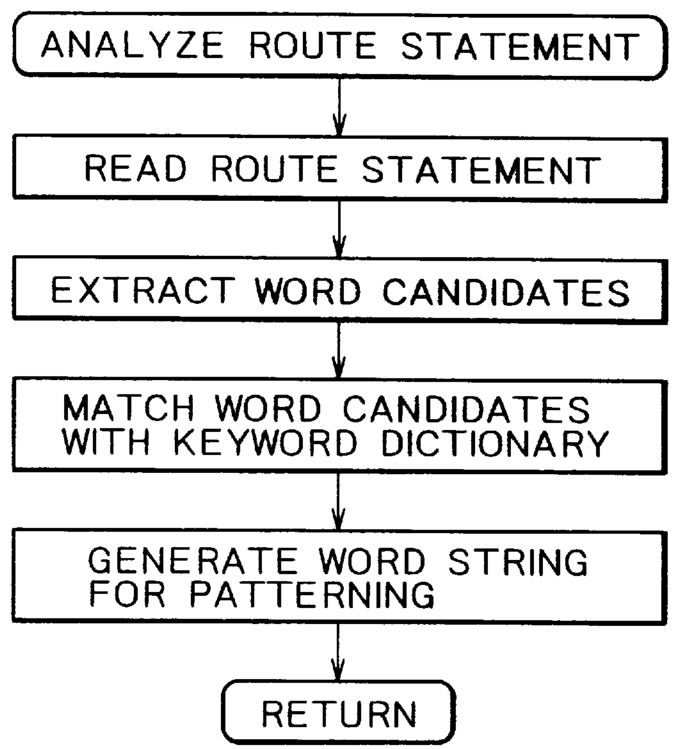
FIG. 20 is a flowchart of steps for analyzing route statements.

Four steps shown in FIG. 20 are initially carried out to translate the route guidance statement in question into a string of words destined for patterning.

Figure 21:
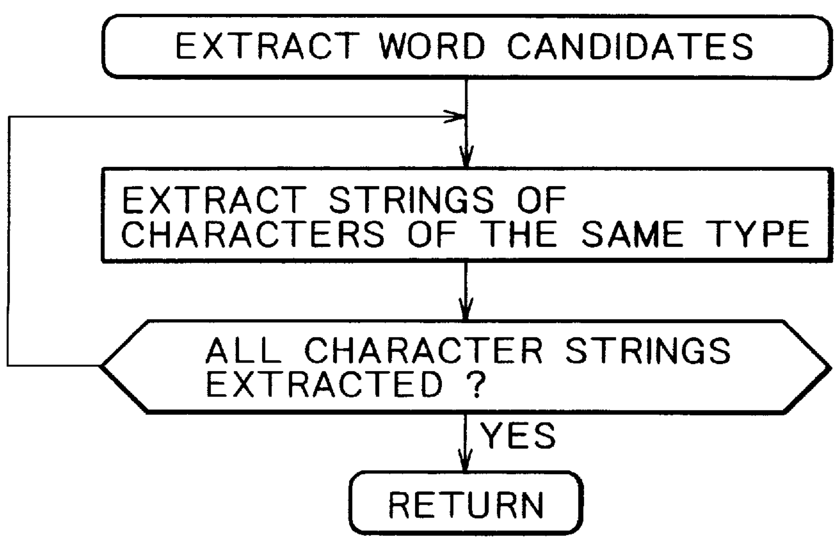
FIG. 21 is a flowchart of steps for extracting word candidates.

In the first step, word candidates are first extracted from the route guidance statement, as shown in FIG. 21. Extraction of each word is made easier illustratively by picking up characters of the same type.

Figure 22:
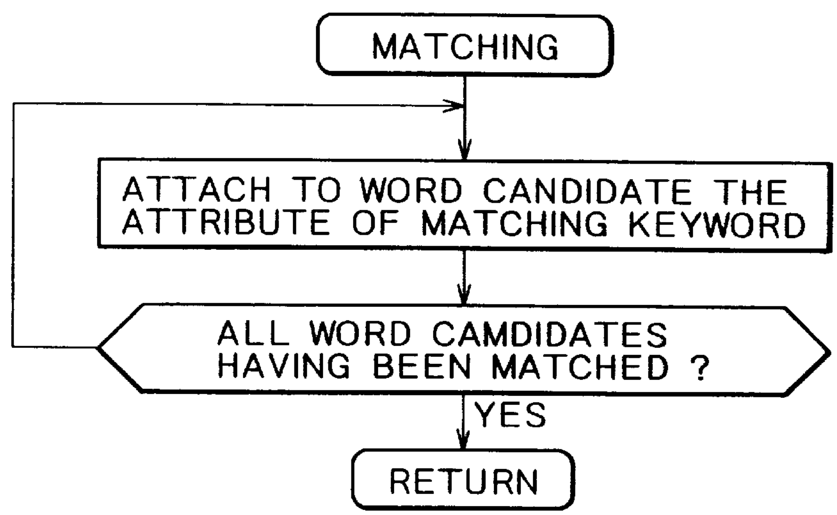
FIG. 22 is a flowchart of steps for matching keywords.

In the second step, as depicted in FIG. 22, each of the word candidates is compared with keys ("KEYS" in FIG. 24). When a word candidate is matched with a key, the attribute (position, direction, route, distance, etc.) of the key is attached to the word candidate in question.

Figure 23:
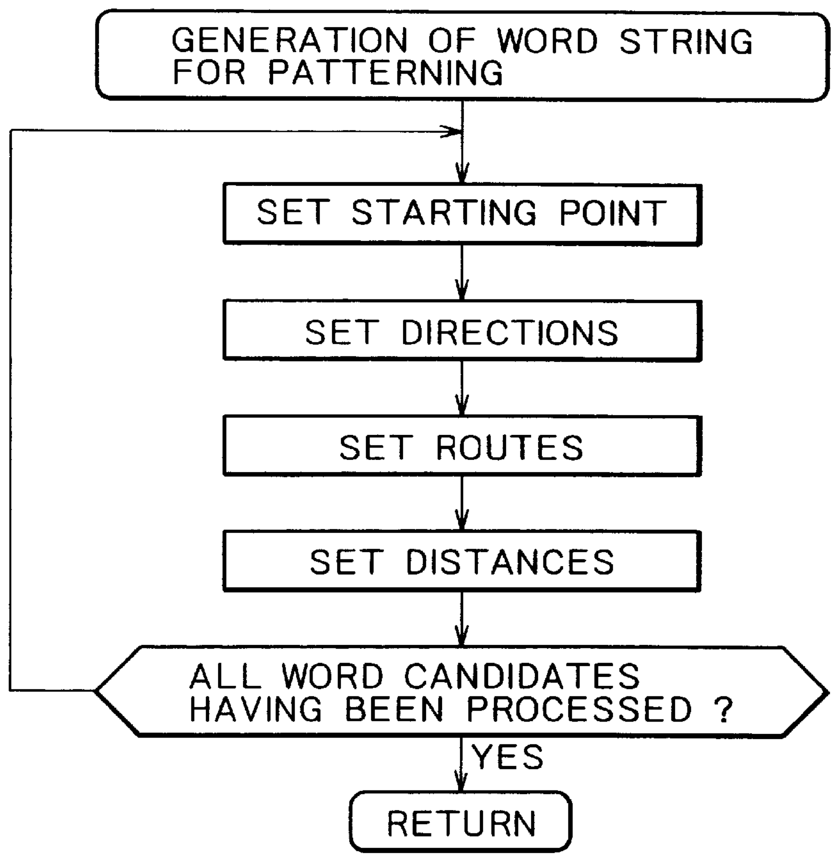
FIG. 23 is a flowchart of steps for generating a word string.
Figure 26:
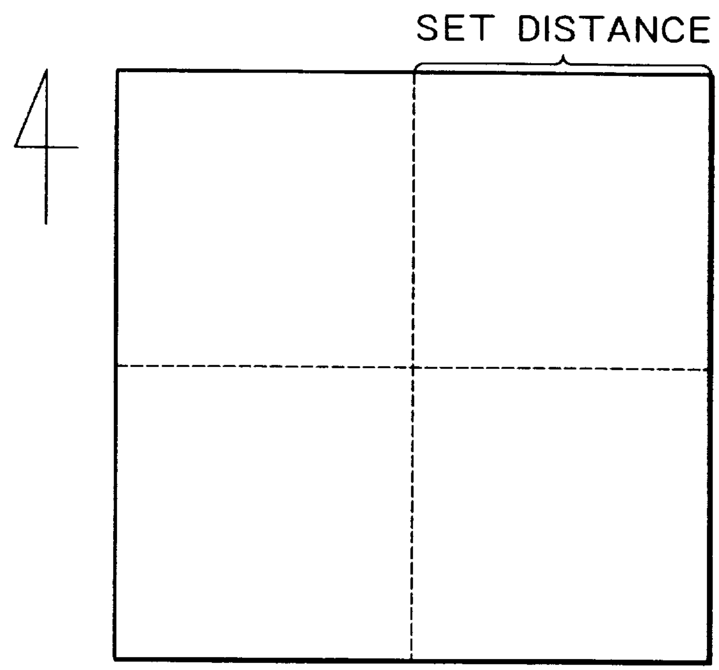
FIG. 26 is a schematic view showing a pattern drawing example.

In the third step, as indicated in FIG. 23, the words are rearranged in terms of a starting point, directions, routes, and distances up to the destination, in that order, with emphasis on word consistency and logic ("PATTERNING" in FIG. 24).

In the fourth step, the word strings above are patterned in the steps shown in FIG. 25.

First, the orientation and an approximate scale of a map to be drawn are established (step 25-1). The initial starting point is set in a mediating location buffer (step 25-2). This mediating location is set close to the center of the map screen (step 25-3). In this state, an initial screen for the map to be drawn is set in a display memory. Thereafter, steps 25-4 through 25-13 below will be repeated until the mediating location coincides with the destination.

Figure 27:
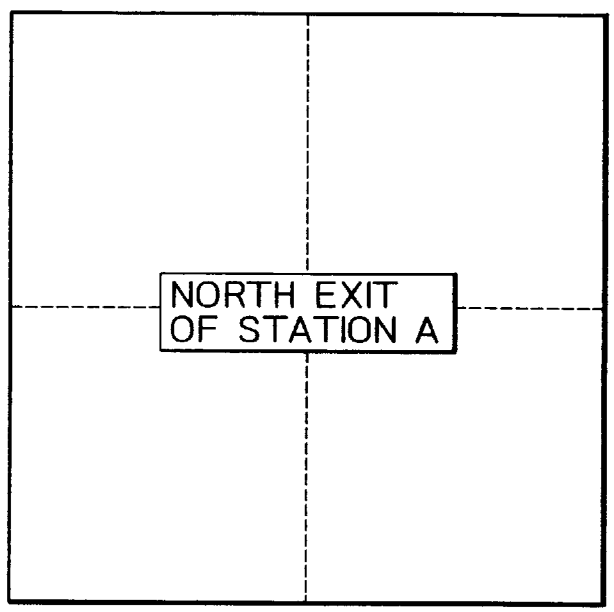
FIG. 27 is a schematic view showing another pattern drawing example.
Figure 28:
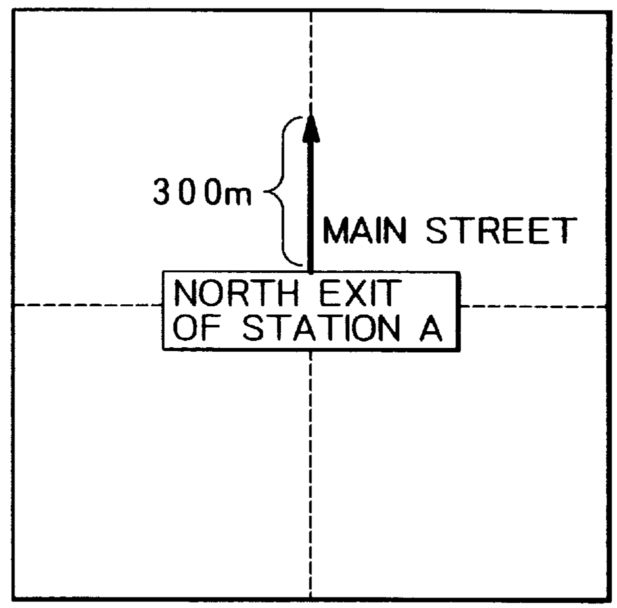
FIG. 28 is a schematic view showing another pattern drawing example.
Figure 29:
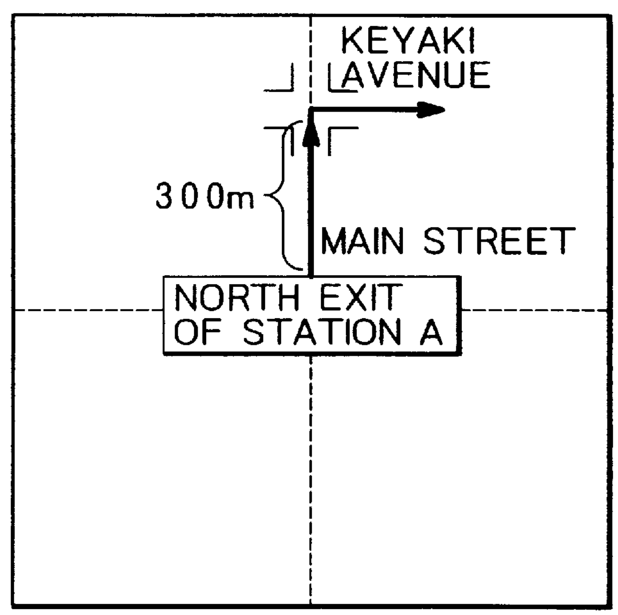
FIG. 29 is a schematic view showing another pattern drawing example.
Figure 30:
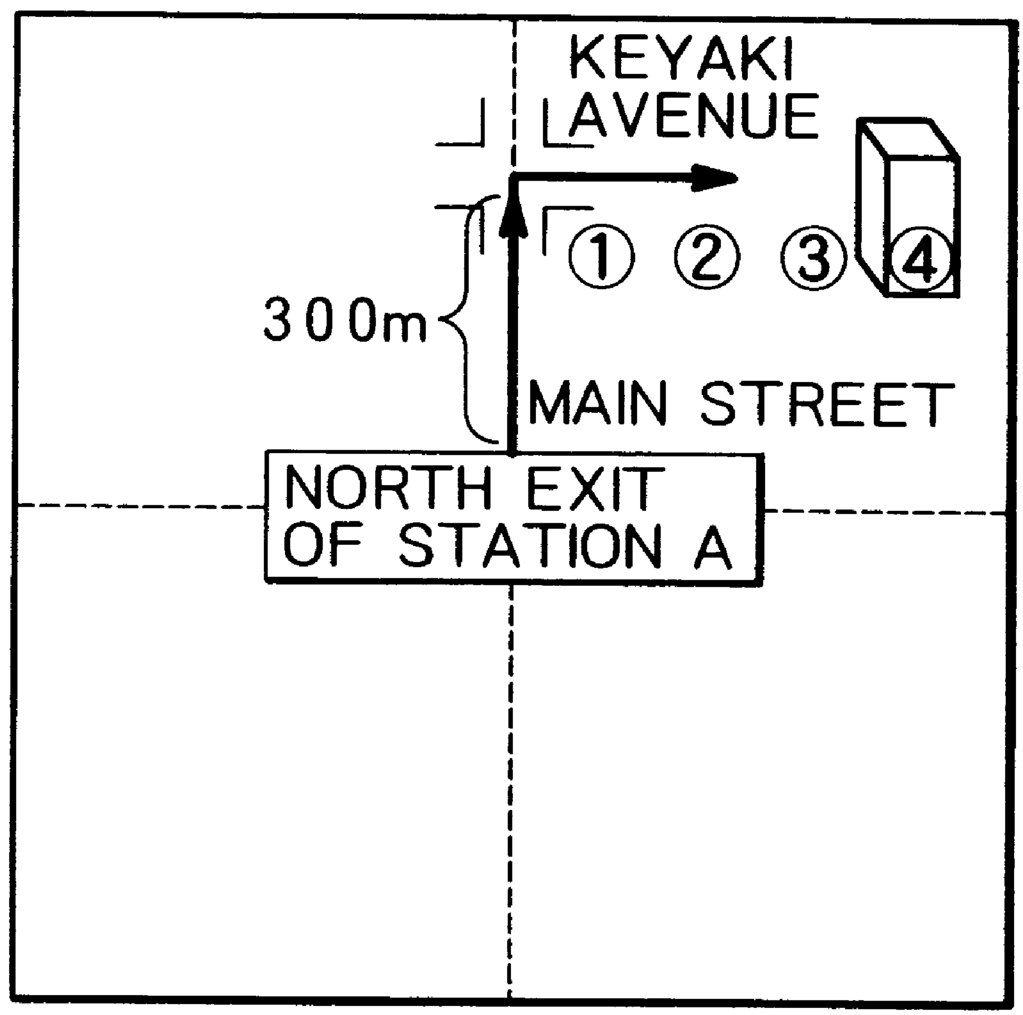
FIG. 30 is a schematic view showing another pattern drawing example.

Station A is first extracted as the starting point from among the word strings for patterning (step 25-4). The location is written to the display memory in the form of a predetermined symbol or a pattern as shown in FIG. 27 (step 25-5). The direction (north), route (main street) and distance (300 m) are extracted. If a routing line is judged to be capable of being drawn on the screen on the initially established scale (step 25-9), then a vector of the set distance from the starting point in the established direction and a name of the route are drawn (steps 25-10, 25-11). This creates a drawing of FIG. 28 in the display memory. The next mediating location (crossing) is extracted (step 25-12). Step 25-4 is then reached again for another pass of patterning. If the drawing range is found in step 25-9 to exceed the settings, step 25-15 is reached in which the scale is suitably modified. Illustratively, when the distance is acquired from the initial starting point to the tip of the vector, the scale may be set for double the ratio of the acquired distance to the set distance. This creates drawings of FIGS. 29 and 30. The final pattern of the building B is drawn in step 25-14.

In the manner described above, a route map may be generated from a route guidance statement. Route guidance statements are obtained illustratively through kana-kanji translation with a keyboard, voice recognition, handwritten character recognition, and off-line image recognition. The route guidance statements thus obtained may each be announced through speech synthesis or drawn in patterns through the above-described processing.

Where light intensity information from an optical sensor, motion information from acceleration sensors, and sound volume information from microphones are used to judge the status of the apparatus, the processing of status judgment by use of such activity sensors will benefit from a classification table such as one shown in FIG. 31. The table, which defines into which medium to translate information of a given medium in each of differently judged states, is retained in a memory area accessible by a user activity recognition processing part 206.

Figure 32:
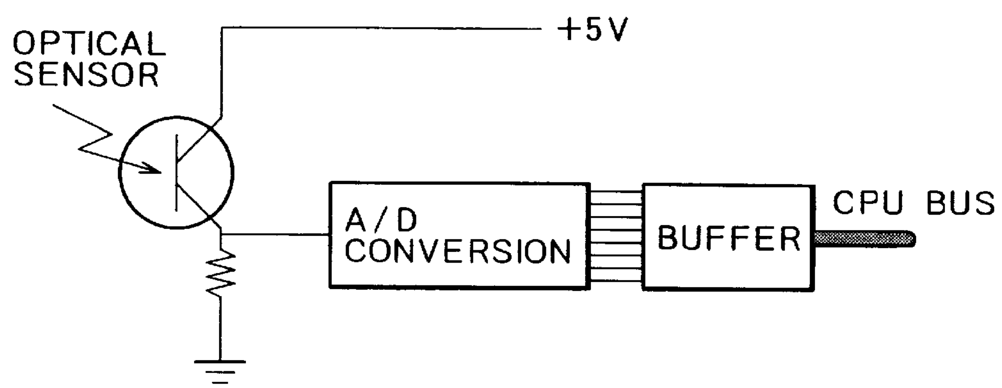
FIG. 32 is a schematic view depicting a structure of an optical sensor.
Figure 33:
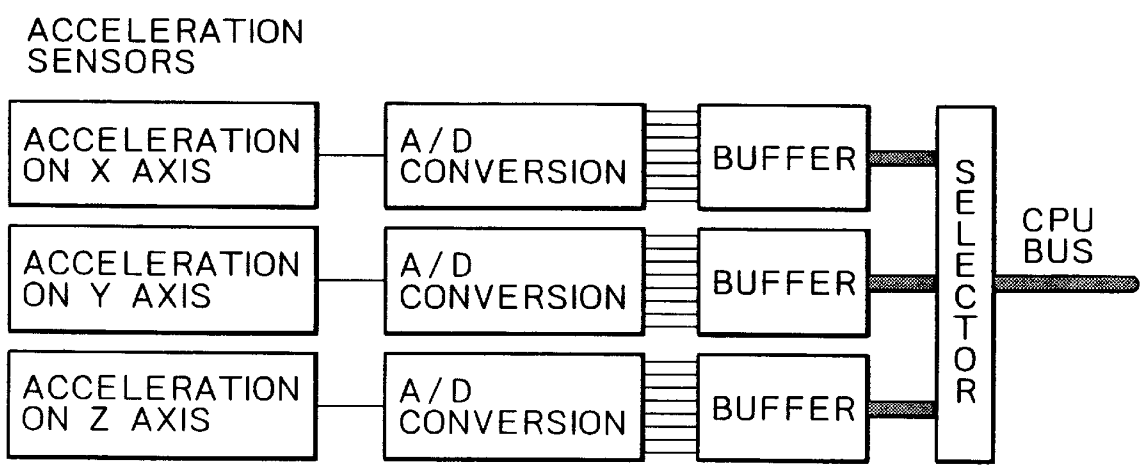
FIG. 33 is a schematic view indicating a structure of an acceleration sensor arrangement.
Figure 34:
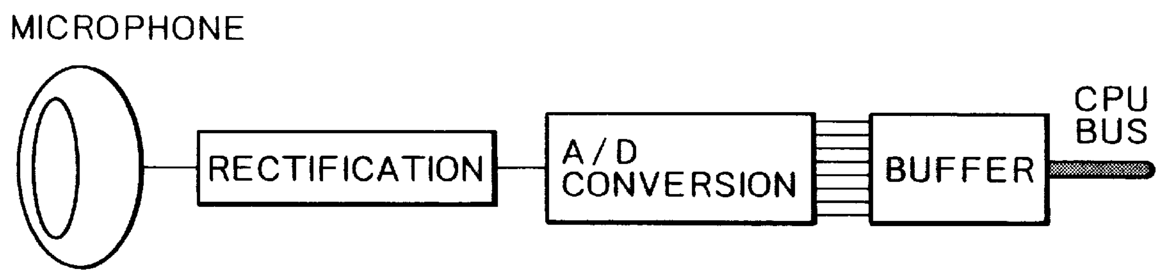
FIG. 34 is a schematic view sketching a structure of a sound volume sensor.

FIGS. 32 through 34 schematically show structures of various sensors. FIG. 32 indicates a structure of the optical sensor. Output voltages of the sensor are subjected to analog-digital conversion (A/D conversion in FIG. 32) by use of a photo-transistor arrangement or the like. The converted voltages are retained in a buffer and retrieved as needed by the user activity recognition processing part 206. If the optical sensor is mounted in parallel with a display surface, the output of the optical sensor is generally increased while the user is watching the display. In that case, a "high" level of light intensity is recognized. If the apparatus is placed in a bag or the like, the output of the optical sensor drops. Then a "low" level of light intensity is recognized.

FIG. 33 shows a structure of a three-axis acceleration sensor arrangement. Outputs of the individual sensors are subjected to analog-digital conversion before being placed into buffers. The buffer contents are selected as needed by a selector and retrieved by the user activity recognition processing part 206.

FIG. 34 outlines a structure of a microphone sensor. The microphone output, which is generally in alternating-current form, is rectified by a rectifying circuit into direct-current form. The resulting DC values are subjected to analog-digital conversion before being placed into a buffer. As in the case of the above-mentioned sensors, the buffer contents are selected by a selector as needed and retrieved by the user activity recognition processing part 206.

Figure 35:
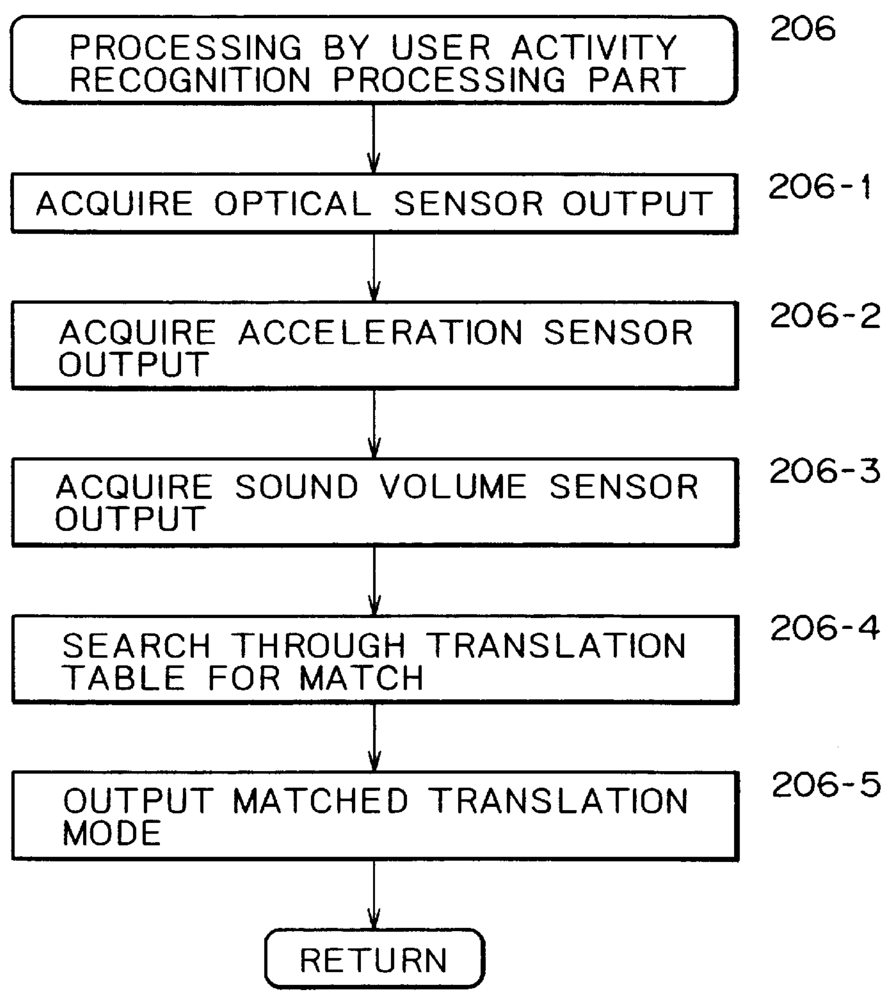
FIG. 35 is a flowchart of steps constituting a process performed by a user activity recognition processing part.

FIG. 35 shows a process flow of the user activity recognition processing part 206. First, the sensor outputs are retrieved (steps 206-1 through 206-3). The processing part 206 then references the classification table to select the applicable state (step 206-4). An appropriate mode for information medium translation is selected and sent to the medium translation controlling part 204.

Figure 36:
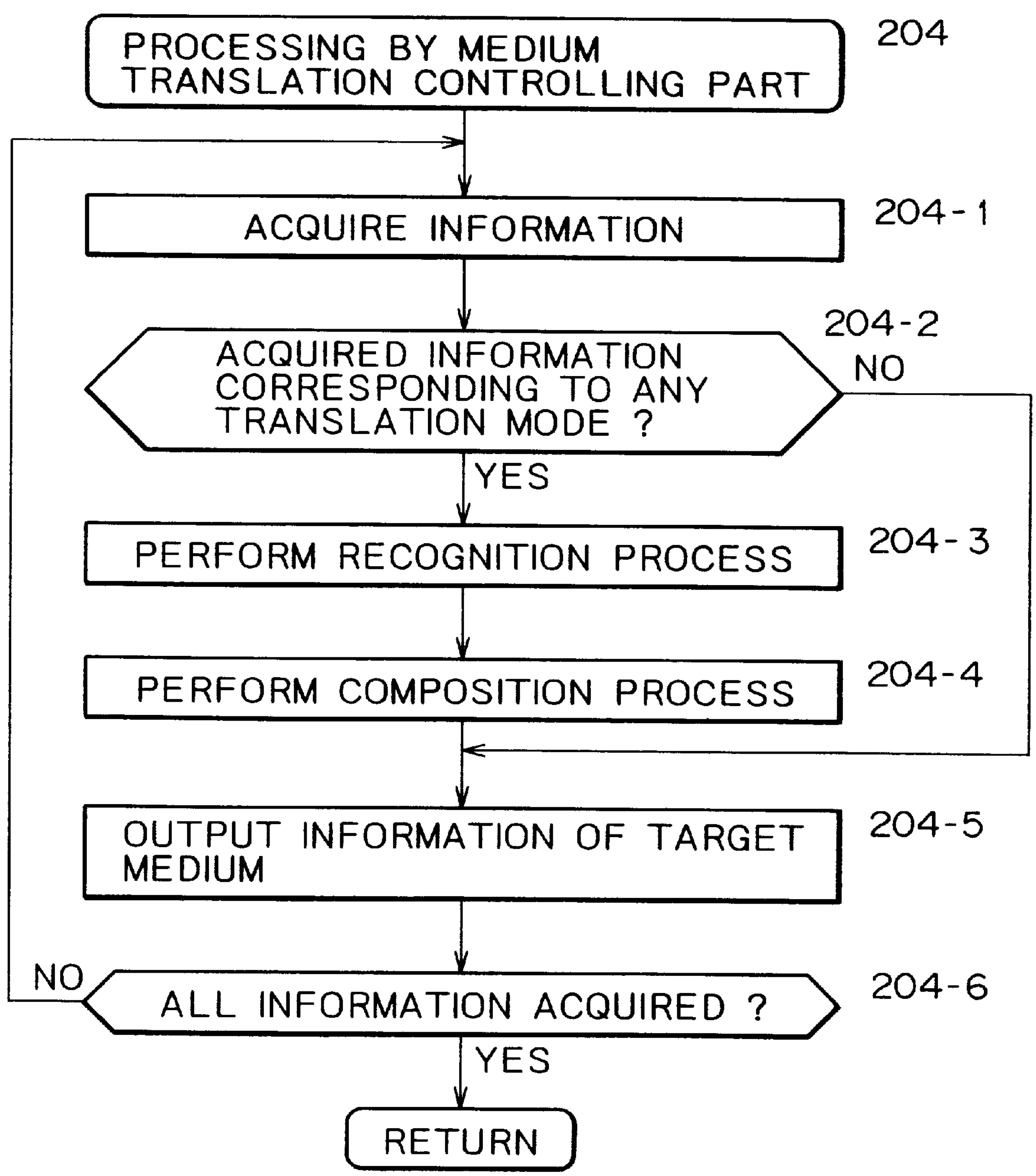
FIG. 36 is a flowchart of steps constituting a process carried out by a medium translation control processing part.

FIG. 36 shows a process flow of the medium translation controlling part 204. First, the information of interest is acquired (step 204-1). A check is made to see if the translation mode corresponding to the acquired information is other than a "no translation" mode (step 204-2). If translation is judged to be necessary, then the information is translated into a target medium through a recognition process (step 204-3). For example, if voice information needs to be translated into character information, the information of interest is translated into character strings through a voice recognition process. A character recognition process or an image recognition process is also utilized as needed. Thereafter, a composition process is carried out for output (step 204-4). In this example, a procedure of translating the character strings into outline fonts corresponds to the composition process. Speech synthesis or pattern drawing is also employed as needed.

INDUSTRIAL APPLICABILITY

As described, the pedestrian navigation system according to the invention provides a detailed route guidance service allowing pedestrians to reach a target location in a specific installation. In addition, the inventive system permits automatic changing of modes for information exchanges depending on the user's status of activity such as walking, working, and participation in a meeting, whereby necessary information is made available in a status-compatible format on a sufficiently detailed basis.

What is claimed is:

1. A pedestrian navigation system for transmitting information to a portable pedestrian guidance apparatus carried by a pedestrian so that the portable pedestrian guidance apparatus outputs the transmitted information to navigate said pedestrian, said pedestrian navigation system comprising:

a plurality of markers mounted at various locations in an installation, wherein each marker outputs a beam which carries installation identification information for identifying a location at which said marker is installed and direction information indicating a direction at which said beam is being emitted by said marker; and a route computation information providing apparatus having a database for a pedestrian-oriented map including the locations of said markers, a computation function for computing routes based on said installation identification information and said direction information, and a communication function for communicating with said portable pedestrian guidance apparatus, wherein said portable pedestrian guidance apparatus comprises:

a communication function for communicating with said route computation information providing apparatus and said markers, and a position and direction measuring function for measuring a position and direction based on said installation identification information and said direction information.

2. A pedestrian navigation system according to claim 1, wherein said portable pedestrian guidance apparatus further comprises:

an information translation function for translating information sent either from said route computation information providing apparatus or from said markers into information in a format applicable to a use state of a user making use of said portable pedestrian guidance apparatus.

3. A pedestrian navigation system according to claim 2, wherein said information translation function comprises:

a detecting part for detecting said use state of said user making use of said portable pedestrian guidance apparatus;

a translation table defining beforehand relations of correspondence between a detected result from said detecting part and said use state of said user;

a judging part for judging said use state of said user based on said detected result from said detecting part and on said translation table; and an information translating part for translating information received by said receiving part in accordance with a judged result from said judging part.

* * * * *